(12) United States Patent
Nakade et al.

(10) Patent No.: US 12,299,771 B2
(45) Date of Patent: May 13, 2025

(54) VIDEO DISPLAY DEVICE AND VIDEO DISPLAY METHOD

(71) Applicant: MAXELL, LTD., Kyoto (JP)

(72) Inventors: Mayumi Nakade, Kyoto (JP); Tamotsu Ito, Kyoto (JP); Yasunobu Hashimoto, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/434,400

(22) PCT Filed: Feb. 26, 2019

(86) PCT No.: PCT/JP2019/007184
§ 371 (c)(1),
(2) Date: Aug. 26, 2021

(87) PCT Pub. No.: WO2020/174554
PCT Pub. Date: Sep. 3, 2020

(65) Prior Publication Data
US 2022/0044450 A1 Feb. 10, 2022

(51) Int. Cl.
*G06T 11/00* (2006.01)
*G01C 21/36* (2006.01)
*G06F 3/14* (2006.01)

(52) U.S. Cl.
CPC .......... *G06T 11/00* (2013.01); *G01C 21/3632* (2013.01); *G06F 3/14* (2013.01)

(58) Field of Classification Search
CPC ........ G06T 11/00; G06F 3/14; G01C 21/3632
See application file for complete search history.

(56) References Cited

U.S. PATENT DOCUMENTS

| 2012/0281102 A1 | 11/2012 | Takahashi |
| 2014/0108137 A1* | 4/2014 | Kuri ...................... G01C 21/20 701/538 |

(Continued)

FOREIGN PATENT DOCUMENTS

| JP | H06-258088 A | 9/1994 |
| JP | 2001-134595 | 5/2001 |

(Continued)

OTHER PUBLICATIONS

International Search Report issued in corresponding International Patent Application No. PCT/JP2019/007184, dated May 14, 2019, with English translation.

*Primary Examiner* — Michelle Chin
(74) *Attorney, Agent, or Firm* — Rimon P.C.

(57) ABSTRACT

A portable video display device includes a sensor that detects a position and a direction of a user, a trajectory information acquisition unit that acquires information of a migration trajectory of the user; a storage unit that stores trajectory information of the user and information of an avatar, and a display unit that displays the migration trajectory of the user with the avatar. A control unit generates an avatar, calculates a current visual field area of the user using the sensor, and displays the avatar on the display unit so as to be disposed in the migration trajectory of the user according to the current visual field area of the user based on the trajectory information of the user stored in the storage unit. When the avatar is moved along the migration trajectory of the user, the avatar is moved from new trajectory information to old trajectory information in time.

11 Claims, 28 Drawing Sheets

(56) References Cited

U.S. PATENT DOCUMENTS

| | | | | |
|---|---|---|---|---|
| 2015/0105155 A1* | 4/2015 | Hardy | .................. | A63F 13/816 |
| | | | | 463/31 |
| 2016/0134840 A1* | 5/2016 | McCulloch | .......... | G06V 40/165 |
| | | | | 348/14.03 |
| 2016/0134938 A1* | 5/2016 | Miyazaki | ............... | H04N 7/142 |
| | | | | 348/14.07 |
| 2017/0103564 A1* | 4/2017 | Hayashida | .............. | A63F 13/56 |
| 2017/0352226 A1* | 12/2017 | Matsuzawa | ............. | A63F 13/67 |
| 2020/0128598 A1* | 4/2020 | Keller | ..................... | H04L 67/12 |

FOREIGN PATENT DOCUMENTS

| | | |
|---|---|---|
| JP | 2008-157880 | 7/2008 |
| JP | 2012-063253 | 3/2012 |
| WO | 2011/093031 A1 | 8/2011 |

* cited by examiner

FIG. 7A

TRAJECTORY INFORMATION STORAGE TABLE 710

| POINT NUMBER 711 | POSITION COORDINATES 712 |
|---|---|
| 0 | $X_0, Y_0, Z_0$ |
| 1 | $X_1, Y_1, Z_1$ |
| ... | ... |
| k | $X_k, Y_k, Z_k$ |
| ... | ... |
| n | $X_n, Y_n, Z_n$ |

FIG. 7B

DIFFERENCE TRAJECTORY INFORMATION STORAGE TABLE 720

| POINT NUMBER (721) | DIFFERENCE POSITION COORDINATES (722) |
|---|---|
| 1 | $\Delta X_1, \Delta Y_1, \Delta Z_1$ |
| 2 | $\Delta X_2, \Delta Y_2, \Delta Z_2$ |
| ⋮ | ⋮ |
| k | $\Delta X_k, \Delta Y_k, \Delta Z_k$ |
| ⋮ | ⋮ |
| n | $\Delta X_n, \Delta Y_n, \Delta Z_n$ |

FIG. 7C

| STARTING POINT /END POINT | POSITION COORDINATES |
|---|---|
| STARTING POINT | $X_0, Y_0, Z_0$ |
| END POINT | $X_n, Y_n, Z_n$ |

STARTING POINT/END POINT 731
POSITION COORDINATE TABLE 730

FIG. 8A

STILL IMAGE DATA STORAGE TABLE 810

| 811 POINT NUMBER | 812 IMAGING DIRECTION | 813 DATA SIZE | 814 IMAGING DATA |
|---|---|---|---|
| $k$ | $\Theta_k$ | $M_k$ | $D_k$ |
| ... | ... | ... | ... |

FIG. 8B

MOVING IMAGE DATA STORAGE TABLE 820

| POINT NUMBER 821 | IMAGING DIRECTION (AT TIME OF START) 822 | DATA SIZE 823 | IMAGING DATA 824 | IMAGING TIME 825 | |
|---|---|---|---|---|---|
| | | | | START | END |
| k | $\Theta_k$ | $M_k$ | $D_k$ | $T_{ks}$ | $T_{ke}$ |
| ... | ... | ... | ... | ... | ... |

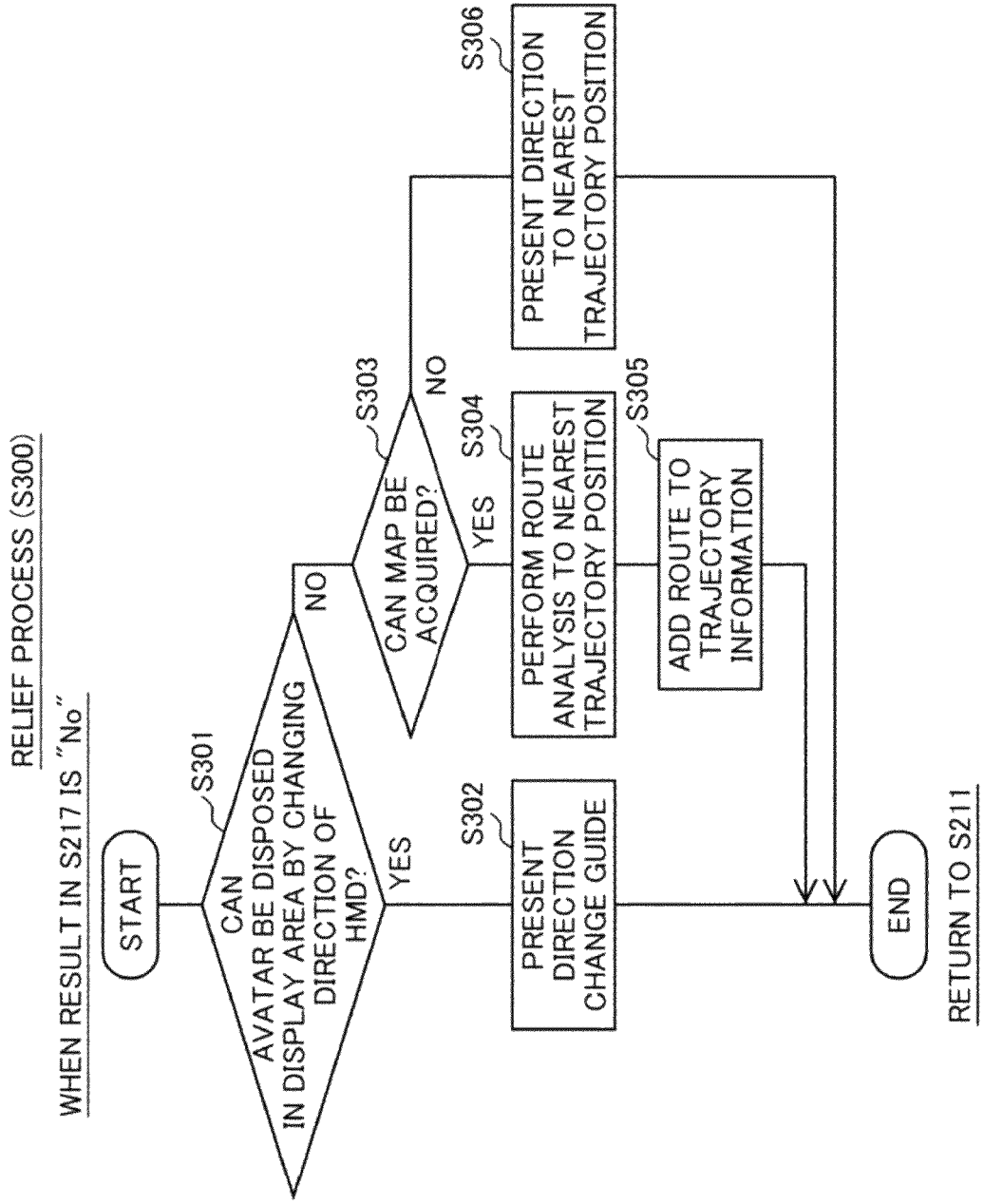

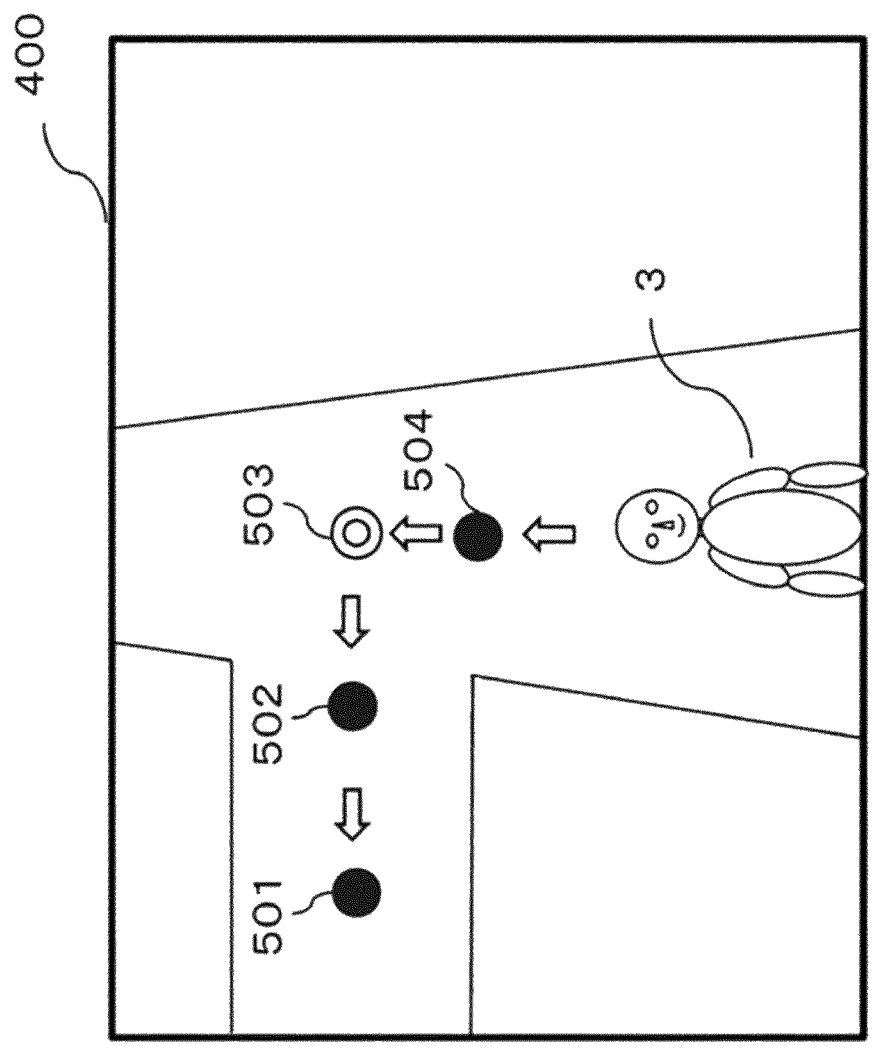

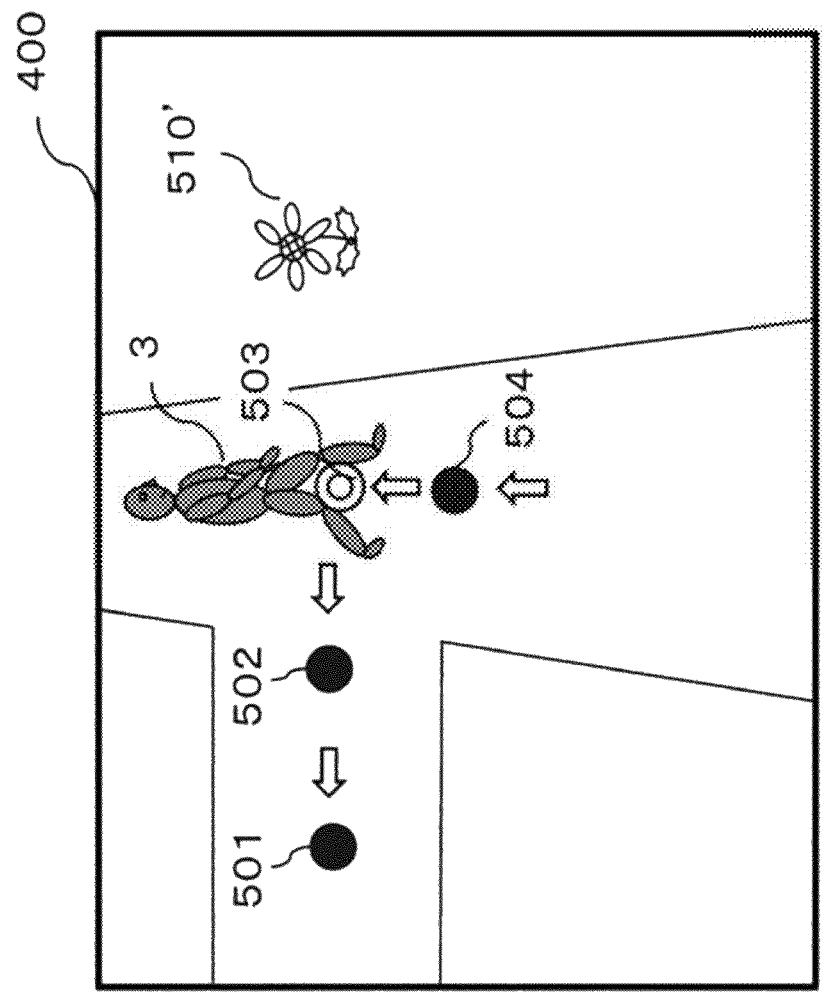

FIG. 12

VOICE COMMAND TABLE 600

| CLASSIFICATION (601) | VOICE COMMANDS (602) | COMMAND NAMES (603) | PROCESSING CONTENT (604) |
|---|---|---|---|
| TRAJECTORY COLLECTION | START OF TRAJECTORY TRAJECTORY START | TRAJECTORY COLLECTION START INSTRUCTION | START TRAJECTORY COLLECTION PROCESS |
| | END OF TRAJECTORY TRAJECTORY END | TRAJECTORY COLLECTION END INSTRUCTION | END TRAJECTORY COLLECTION PROCESS |
| | IMAGING RECORDING | STILL IMAGE IMAGING INSTRUCTION | CAPTURE STILL IMAGE AND STORE IMAGING DATA |
| | START OF IMAGING RECORDING START | MOVING IMAGE CAPTURE START INSTRUCTION | START CAPTURE OF MOVING IMAGE |
| | END OF IMAGING RECORDING END | MOVING IMAGE CAPTURE END INSTRUCTION | END CAPTURE OF MOVING IMAGE AND STORE IMAGING DATA |
| | ... | ... | ... |
| AVATAR DISPLAY | START OF AVATAR AVATAR START | AVATAR DISPLAY START INSTRUCTION | START AVATAR DISPLAY PROCESS |
| | END OF AVATAR AVATAR END | AVATAR DISPLAY END INSTRUCTION | END AVATAR DISPLAY PROCESS |
| | REPRODUCTION IMAGING DATA | IMAGING DATA REPRODUCTION INSTRUCTION | REPRODUCE IMAGING DATA OF STILL IMAGE OR MOVING IMAGE |
| | ... | ... | ... |

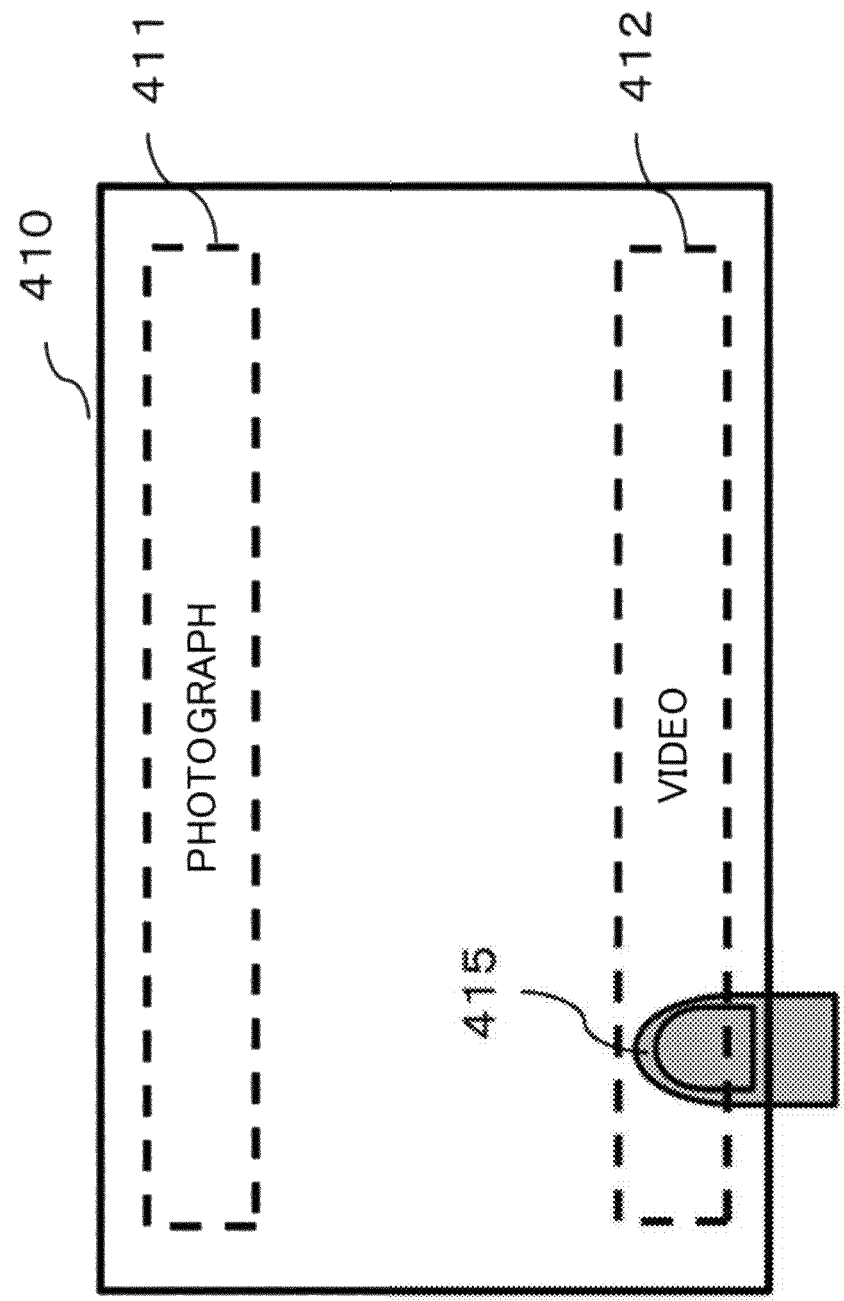

FIG. 14A

TWO-DIMENSIONAL TRAJECTORY INFORMATION STORAGE TABLE 740

| POINT NUMBER 741 | DIFFERENCE POSITION COORDINATES 742 |
|---|---|
| 1 | $\Delta X_1, \Delta Y_1$ |
| 2 | $\Delta X_2, \Delta Y_2$ |
| ... | ... |
| k | $\Delta X_k, \Delta Y_k$ |
| ... | ... |
| n | $\Delta X_n, \Delta Y_n$ |

FIG. 14B

| STARTING POINT /END POINT | POSITION COORDINATES |
|---|---|
| STARTING POINT | $X_0, Y_0, Z_0$ |
| END POINT | $X_n, Y_n$ |

751 752

TWO-DIMENSIONAL STARTING POINT/END POINT POSITION COORDINATE TABLE 750

FIG. 17A

TRAJECTORY INFORMATION STORAGE TABLE 710'

| POINT NUMBER 711 | POSITION COORDINATES 712 | PASSAGE TIME 713 |
|---|---|---|
| 0 | $X_0, Y_0, Z_0$ | $T_0$ |
| 1 | $X_1, Y_1, Z_1$ | $T_1$ |
| ... | ... | ... |
| k | $X_k, Y_k, Z_k$ | $T_k$ |
| ... | ... | ... |
| n | $X_n, Y_n, Z_n$ | $T_n$ |

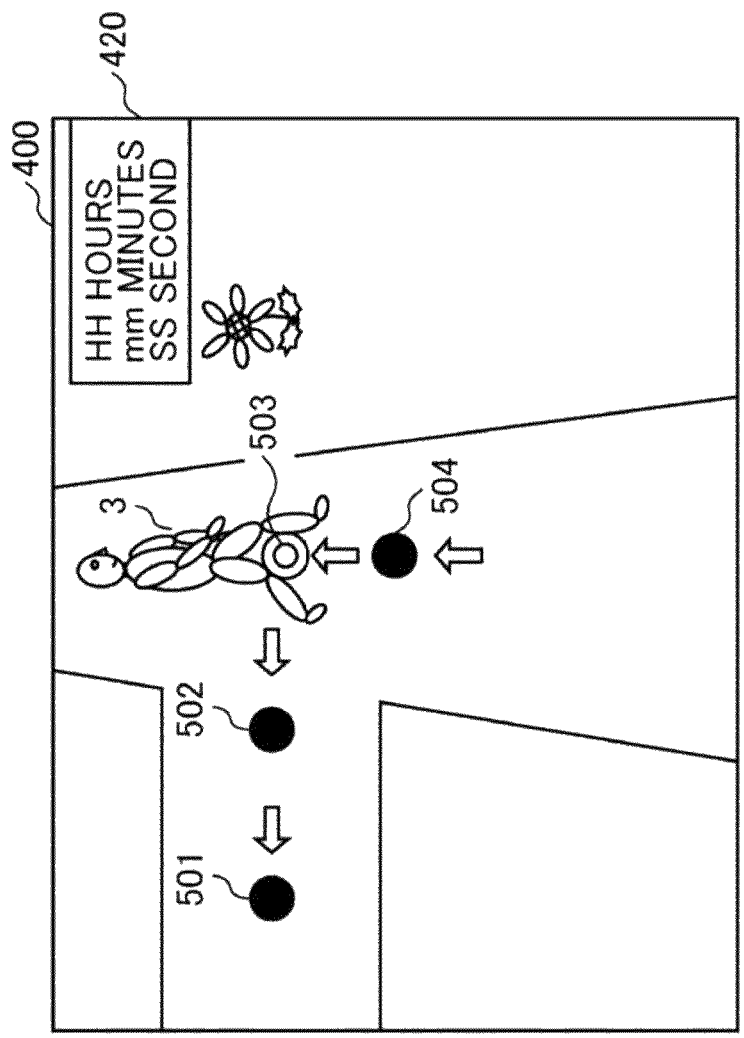

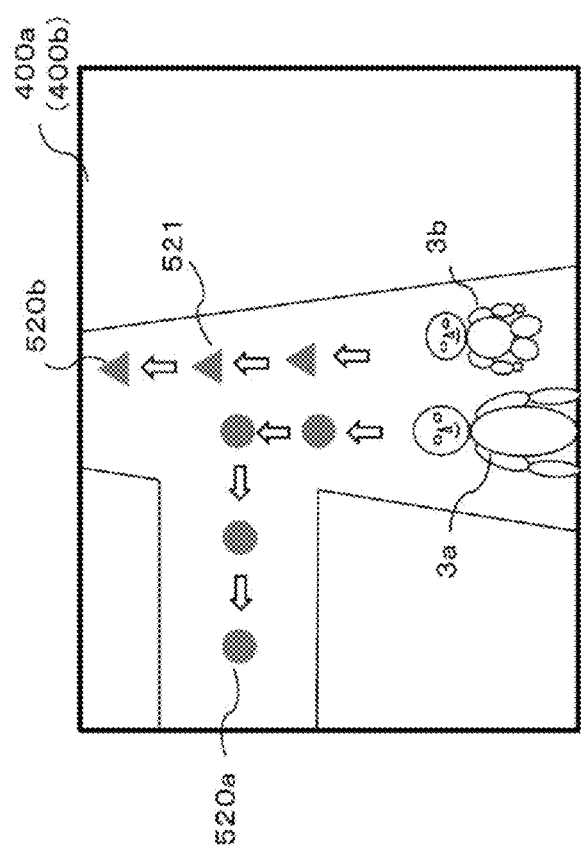

VIDEO DISPLAY DEVICE AND VIDEO DISPLAY METHOD

CROSS-REFERENCE TO RELATED APPLICATIONS

This application is the U.S. National Phase under 35 U.S.C. § 371 of International Application No. PCT/JP2019/007184, filed on Feb. 26, 2019, the entire content of which is hereby incorporated by reference.

TECHNICAL FIELD

The present invention relates to a portable video display device and a video display method.

BACKGROUND ART

In recent years, portable video display devices represented by smartphones have become widespread in the world. Among them, a head-mounted display (HMD) that is mounted on the head of the user displays an image of a real space and an image of augmented reality (AR) created by, for example, a computer on a glasses-type display screen so as to be superimposed on each other. In addition, a sensor can be attached to the HMD, and information acquired by the sensor can be displayed as an AR image on the display screen. For example, Patent Document 1 discloses, as a mobile terminal that describes an action history of a user, a configuration including: a terminal information acquisition means that acquires position information of a host terminal; a camera means that generates a camera image obtained by capturing the surroundings; a depiction history calculation means that calculates action history depiction information (avatar) to be displayed on the basis of the action history acquired in advance and an imaging range of the camera means; an image combination means that generates a composite image in which the action history depiction information has been depicted on the camera image; and a display means that displays the composite image.

CITATION LIST

Patent Document

Patent Document 1: WO 2011/093031 A

SUMMARY OF THE INVENTION

Problems to be Solved by the Invention

There are many cases in which old users forget the place where they stopped off or a return route while traveling on a complicated route. In this case, there is a method that guides a typical route back to a starting point when the user sets the starting point as in a navigation device. However, the method does not always guide the same route as that through which the user actually passed, and it is not expected that the method will accurately reproduce the route on the way.

In Patent Document 1, when the user inputs an instruction to record the action history, the action history is registered in an action history server. Then, the action history of a desired user is acquired from the action history server, and an avatar is displayed so as to be superimposed on the camera image according to the position information of the user. However, in Patent Document 1, it is assumed that the action history of any other user is acquired and displayed, and the display of the action history of the user of the terminal is not particularly considered. In addition, when the action history is displayed, the avatar is displayed in the order in which the user moved to the points where the user moved. Therefore, the disclosed configuration is not suitable as a tool to guide the user, who has forgotten the return route, from the current position to the return route.

An object of the invention is to provide a video display device that guides a return route along a route through which a user moved actually.

Solutions to Problems

In order to solve the problem, a video display device according to the invention includes: a sensor that detects a position and a direction of a user carrying the video display device; a trajectory information acquisition unit that acquires information of a migration trajectory of the user from a detection result of the sensor; a storage unit that stores trajectory information of the user acquired by the trajectory information acquisition unit and information of an avatar which is a virtual image indicating the user; a display unit that displays the migration trajectory of the user with the avatar; and a control unit that controls the trajectory information acquisition unit and the display unit. The control unit generates the avatar from the information of the avatar stored in the storage unit, calculates a current visual field area of the user using the sensor, and displays the avatar on the display unit so as to be disposed in the migration trajectory of the user according to the current visual field area of the user on the basis of the trajectory information of the user stored in the storage unit.

Effects of the Invention

According to the invention, it is possible to guide a user, who has forgotten the place where the user stopped off when moving or a return route, so as to easily understand the return route.

BRIEF DESCRIPTION OF THE DRAWINGS

FIG. 7A illustrates a trajectory information storage table that stores position information.

FIG. 7B illustrates a difference trajectory information storage table that stores position information as a difference value.

FIG. 7C illustrates a starting point/end point position coordinate table that stores position information when trajectory collection starts and when the trajectory collection ends.

FIG. 8A illustrates a still image data storage table that stores still images.

FIG. 8B illustrates a moving image data storage table that stores moving images.

FIG. 9B is a flowchart illustrating a relief process in FIG. 9A.

FIG. 11A is a diagram illustrating an example of the display of an avatar.

FIG. 11B is a diagram illustrating an example of display in which the avatar changes its orientation.

FIG. 12 is a table illustrating an example of voice commands used for operating the HMD.

FIG. 13 is a diagram illustrating an operation instruction by a user's finger.

FIG. 14A illustrates a two-dimensional trajectory information storage table that stores position information according to Embodiment 2.

FIG. 14B illustrates a two-dimensional starting point/end point position coordinate table when trajectory collection starts and when the trajectory collection ends.

FIG. 17A illustrates a trajectory information storage table according to Embodiment 7.

FIG. 17B is a diagram illustrating an example of the display of an avatar.

FIG. 20 is a schematic diagram illustrating an example of the display of a plurality of avatars.

MODE FOR CARRYING OUT THE INVENTION

Hereinafter, embodiments of the invention will be described with a focus on an example of a head-mounted display (HMD) which is a head-mounted video display device.

Embodiment 1

Figure 1:
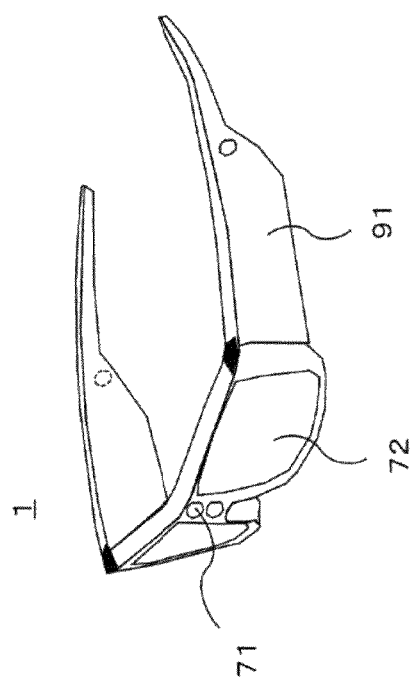
FIG. 1 is a diagram illustrating the outward appearance of an HMD according to Embodiment 1.

FIG. 1 is a diagram illustrating the outward appearance of an HMD according to Embodiment 1. An HMD 1 is a glasses type in which a display unit 72 that allows a user to visually recognize an image and an imaging unit 71 that captures an outdoor scene are disposed in a front surface and various processing units, which will be described below, are stored in a temple portion 91. Further, some of the processing units in the temple portion 91 may be separated from a main body of the HMD, may be stored in another housing, and may be connected to the main body of the HMD by a cable.

Figure 2:
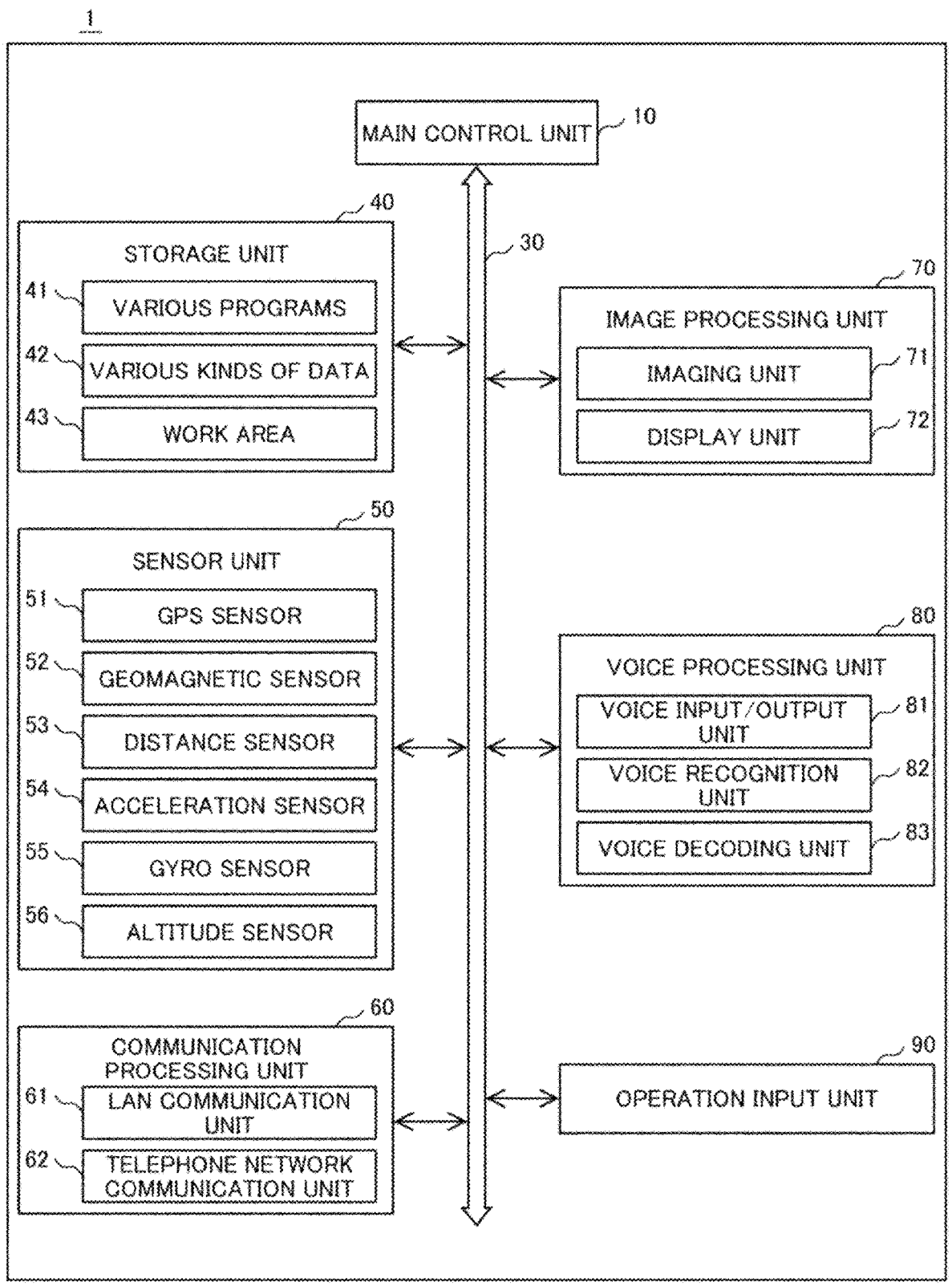
FIG. 2 is a block diagram illustrating an internal configuration of the HMD.

FIG. 2 is a block diagram illustrating the internal configuration of the HMD 1. The HMD 1 includes a main control unit 10, a system bus 30, a storage unit 40, a sensor unit 50, a communication processing unit 60, an image processing unit 70, a voice processing unit 80, and an operation input unit 90.

The main control unit 10 is a microprocessor unit that controls the entire HMD 1 according to a predetermined operation program. The system bus 30 is a data communication path for transmitting and receiving various kind of commands and data between the main control unit 10 and each constituent block in the HMD 1.

The storage unit 40 stores various programs 41 for controlling the operation of the HMD 1 and various kinds of data 42 including operation setting values, detection values from a sensor unit which will be described below, and objects including contents, and has a work area 43 that is used for various program operations. At that time, the storage unit 40 can store an operation program downloaded from a network, various kinds of data created by the operation program, and contents such as downloaded moving images, still images, and voices. In addition, the storage unit 40 can store data such as moving images and still images captured by the imaging unit 71. The storage unit 40 needs to hold the stored information even in a state in which the HMD 1 is not supplied with power from the outside. Therefore, devices, such as semiconductor element memories including flash ROMs and solid state drives (SSDs) and magnetic disk drives including hard disc drives (HDDs), are used as the storage unit. Further, the update and function expansion of each of the operation programs stored in the storage unit 40 can be performed by a download process from each server device on the network.

The sensor unit 50 includes, for example, a global positioning system (GPS) sensor 51, a geomagnetic sensor 52, a distance sensor 53, an acceleration sensor 54, a gyro sensor 55, and an altitude sensor 56 in order to detect various states of the HMD 1. For example, the position, inclination, direction, movement, and altitude of the HMD 1 are detected by these sensor groups. In addition, the sensor unit 50 may include other sensors such as an illuminance sensor and a proximity sensor.

The communication processing unit 60 includes a local area network (LAN) communication unit 61 and a telephone network communication unit 62. The LAN communication unit 61 is connected to the network, such as the Internet, through an access point or the like and transmits and receives data to and from each server device on the network. The connection to the access point or the like may be a wireless connection such as Wi-Fi (registered trademark).

The telephone network communication unit 62 performs telephone communication (call) and data transmission and reception using wireless communication with, for example, a base station of a mobile telephone communication network. The communication with, for example, the base station may be performed by a Wideband Code Division Multiple Access (W-CDMA) (registered trademark) system, a Global System for Mobile communications (GSM) (registered trademark) system, a Long Term Evolution (LTE) system, or other communication systems. Each of the LAN communication unit 61 and the telephone network communication unit 62 includes, for example, an encoding circuit, a decoding circuit, and an antenna. In addition, the communication processing unit 60 may further include other communication units such as a Bluetooth (registered trademark) communication unit and an infrared communication unit.

The image processing unit 70 includes the imaging unit 71 and the display unit 72. The imaging unit 71 is a camera unit that converts light input from a lens into an electric signal using an electronic device, such as a charge coupled device (CCD) or a complementary metal oxide semiconductor (CMOS) sensor, and inputs image data of an object in an outdoor scene. The display unit 72 is a display device of a transmission-type display using, for example, a laser projector and a half mirror and provides image data to the user of the HMD 1.

The voice processing unit 80 includes a voice input/output unit 81, a voice recognition unit 82, and a voice decoding unit 83. A voice input of the voice input/output unit 81 is a microphone, and the microphone converts the user's voice or the like into voice data and inputs the voice data. In addition, a voice output of the voice input/output unit 81 is a speaker, and the speaker outputs, for example, voice information necessary for the user. The voice recognition unit 82 analyzes the input voice information and extracts, for example, instruction commands. The voice decoding unit 83 performs an encoded voice signal decoding process and a voice synthesis process.

The operation input unit 90 is an instruction input unit that inputs an operation instruction to the HMD 1. The operation input unit 90 is composed of, for example, operation keys obtained by arranging button switches and may further include other operation devices. For example, the HMD 1 may be operated by a separate mobile terminal device that is connected by wired communication or wireless communication using the communication processing unit 60. Further, the HMD 1 may be operated by a voice command of an operation instruction using the voice recognition unit 82 of the voice processing unit 80.

The configuration example of the HMD 1 illustrated in FIG. 2 includes many configurations that are not essential to this embodiment. However, even in a case in which these configurations are not provided, the effect of this embodiment is not impaired. On the contrary, the HMD 1 may further have configurations (not illustrated) such as a digital broadcast reception function and an electronic money payment function.

Figure 3:
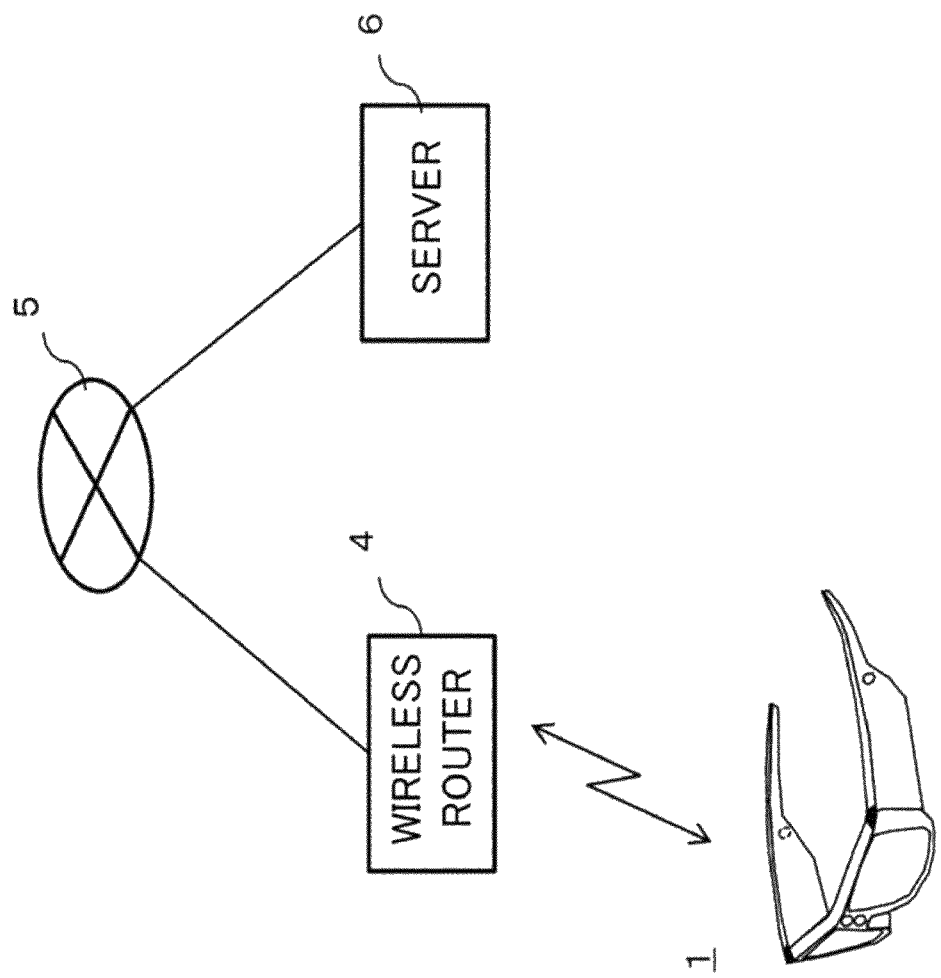
FIG. 3 is a diagram illustrating an example of a connection configuration with an external device by a communication processing unit.

FIG. 3 is a diagram illustrating an example of a connection configuration with an external device by the communication processing unit 60. The LAN communication unit of the HMD 1 is connected to a network 5, such as the Internet, through a wireless router 4 which is an access point. A server 6 is connected to the network 5 and transmits and receives data through the LAN communication unit 61 of the HMD 1.

Figure 4:
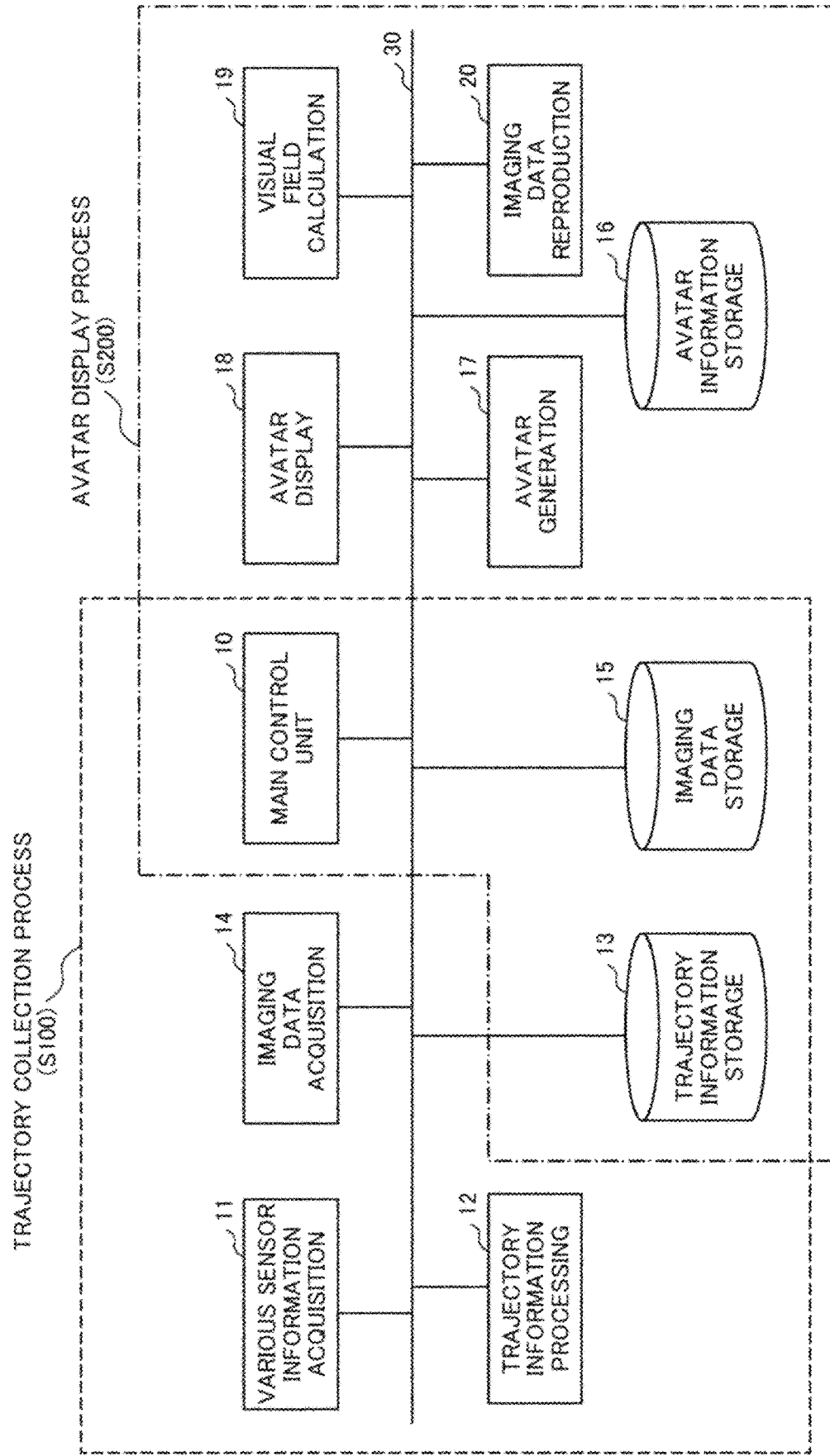
FIG. 4 is a diagram illustrating a configuration of functional blocks of the HMD.

FIG. 4 is a diagram illustrating the configuration of functional blocks of the HMD 1.

The main control unit 10 mainly performs a process of controlling the entire HMD 1 using the various programs 41 and the various kinds of data 42 in the storage unit 40. The processes of the HMD 1 include a trajectory collection process (S100) that collects and stores information related to the migration trajectory of the user and an avatar display process (S200) that displays an avatar which is a virtual image indicating the user on the basis of the stored trajectory information (which are represented by a dashed line and a chain line, respectively).

In the trajectory collection process (S100), information from various sensors of the sensor unit 50 is acquired by a various sensor information acquisition function 11, and the information acquired from the various sensors is converted into trajectory information that can be easily processed in the HMD by a trajectory information processing function 12. The converted trajectory information is stored by a trajectory information storage function 13. In addition, when a user inputs an imaging instruction during the acquisition of the trajectory information, the imaging unit 71 of the image processing unit 70 is used to perform imaging. An imaging process in this case is performed by an imaging data acquisition function 14, and the acquired imaging data is stored by an imaging data storage function 15 so as to be associated with the trajectory information.

In the avatar display process (S200), avatar information of the user stored in advance in an avatar information storage function 16 is read out, and an avatar display function 18 displays an avatar generated by an avatar generation function 17. A display position of the avatar is determined on the basis of the trajectory information stored in the trajectory information storage function 13. However, a visual field calculation function 19 determines whether or not the display position of the avatar is present in the visual field of the HMD 1. When the display position is absent, the avatar is not displayed. Further, an imaging data reproduction function 20 reproduces the imaging data stored in the imaging data storage function 15 according to a path trajectory.

The storage functions, such as the trajectory information storage function 13, the imaging data storage function 15, and the avatar information storage function 16, may be stored in the external server 6 through the LAN communication unit 61 of the communication processing unit 60 as illustrated in FIG. 3.

Figure 5:
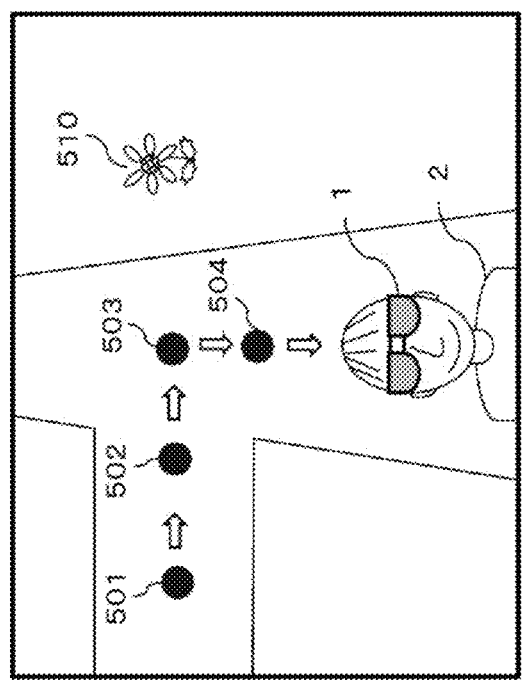
FIG. 5 is a schematic diagram illustrating an example of the collection of a trajectory of a user.

FIG. 5 is a schematic diagram illustrating an example of the collection of the user's trajectory. In this example, a user 2 who wears the HMD 1 is moving in the order of trajectory points 501, 502, 503, and 504 (represented by ●). In addition, at the trajectory point 503 (corner) where the movement direction is changed by 90 degrees, the imaging unit captures an image of an object 510. Therefore, the trajectory point 503 is an imaging point. Here, the object to be imaged is determined by the user's intention and is, for example, animals, plants, and buildings that the user saw in the place where the user stopped off, at a corner, or in a place on a wrong route. The captured image will be reproduced later when the path trajectory is reproduced.

Figure 6:
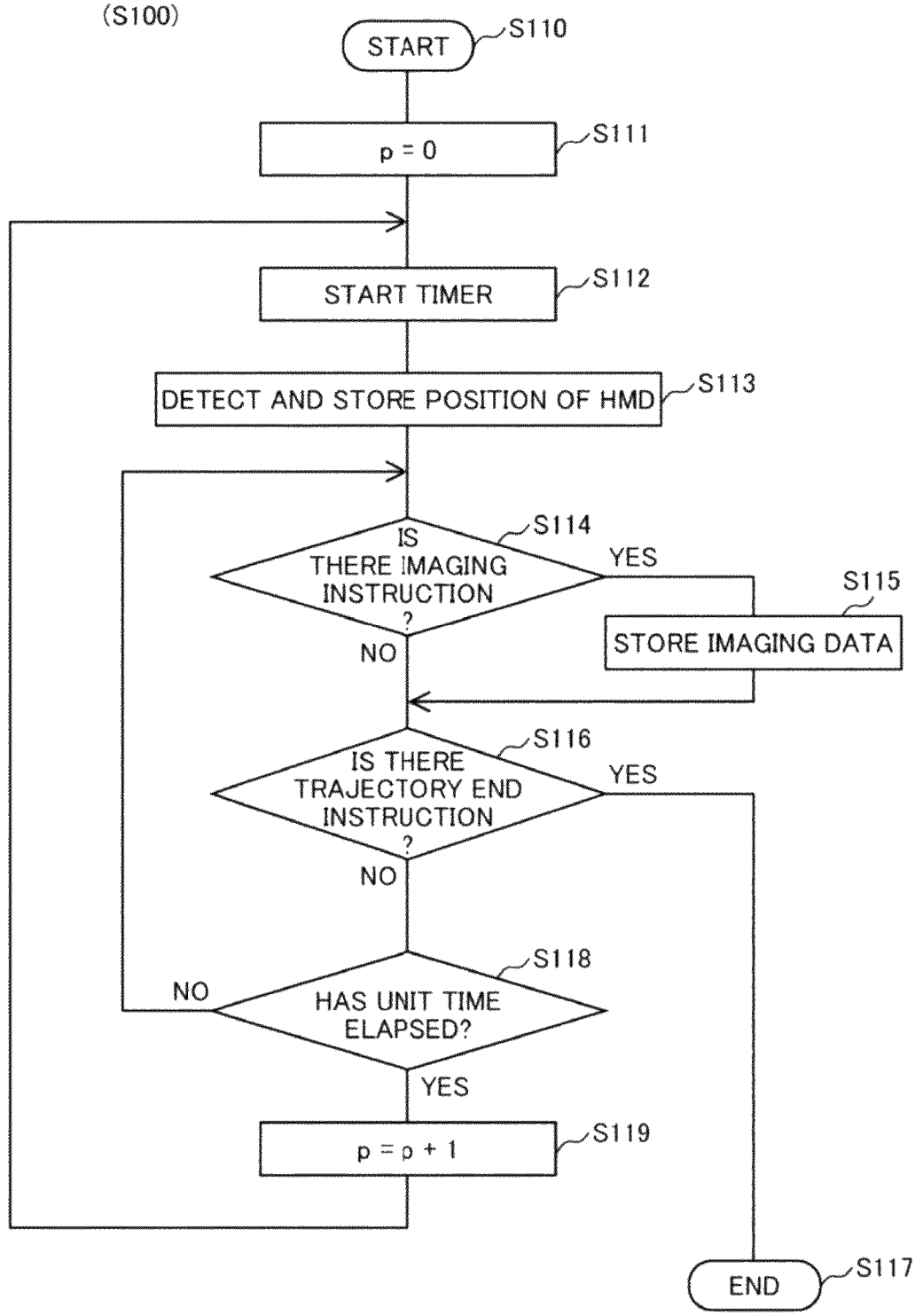
FIG. 6 is a flowchart illustrating a trajectory collection process.

FIG. 6 is a flowchart illustrating the trajectory collection process (S100) of the HMD 1, and the schematic diagram illustrating the trajectory in FIG. 5 is given as an example. This processing procedure is stored in the various programs 41 of the storage unit 40.

S110: The trajectory collection process (S100) is started in response to an instruction from the user 2. In this embodiment, a trajectory collection start instruction is input by the voice of the user 2. For example, when the user utters a voice command "Trajectory Start", the voice recognition unit determines that an instruction to start the trajectory collection process is input.

S111: The point numbers of the trajectory points are initialized. Here, it is assumed that 0 is set as an initial value of a point number p, and the point number p at the start time of the trajectory collection process is 0.

S112: A timer is started. The timer measures time using a clock provided in the main control unit 10. The timer is used to collect the data of the trajectory points of the user at regular time (unit time) intervals.

S113: The position of the HMD 1 is detected by the information from the sensor unit 50 (various sensor information acquisition function 11), is converted into a storage data format (trajectory information processing function 12), and is stored in the various kinds of data 42 of the storage unit 40 (trajectory information storage function 13). The position of the HMD 1 in the plane is detected by the GPS sensor 51 of the sensor unit 50. Radio waves can be received from a plurality of GPS satellites to detect the global position coordinates (longitude and latitude) of the HMD 1. In addition, the altitude can be detected by the height sensor 56 of the sensor unit 50. For example, the atmospheric pressure is measured to calculate the altitude.

For the position information of the HMD 1, global position information may be acquired using, for example, information transmitted from Wi-Fi (registered trademark), Bluetooth (registered trademark), and a mobile base station, in addition to the GPS information from the GPS satellites. Therefore, when it is difficult to acquire the GPS information, the position information of the HMD 1 is acquired from these information items. Of course, other information may be combined with the GPS information. Hereinafter, the information for acquiring the global position information is referred to as "GPS information or the like".

In addition, in an environment in which the global position information can always be acquired with high accuracy, the trajectory information of the user can be disposed in a spatial coordinate system using the global position information. On the other hand, a unique spatial coordinate system (local coordinate system) having a trajectory acquisition start position as the origin may be generated, and a change in position may be calculated from the movement distance or movement direction of the user detected by, for example, the acceleration sensor 54 or the gyro sensor 55 of the sensor unit 50 and may be disposed in the local coordinate system. Then, the global position information may be acquired at a point where the global position information can be acquired with high accuracy and may be associated with the position information of the local coordinate system. With this configuration, the embodiment can also be applied to, for example, a case in which it is difficult to continuously acquire the trajectory or a case in which the user sees the trajectory information of another person.

S114: It is determined whether or not the user inputs an imaging instruction. When there is an imaging instruction, the process proceeds to S115. When there is no imaging instruction, the process proceeds to S116. In addition, two imaging modes, that is, a still image capture mode and a moving image capture mode are prepared in the imaging function of the imaging unit 71. In order to distinguish between the two imaging modes, for example, a voice command "Imaging" is used as a still image capture instruction, and a voice command "Imaging Start" is used as a moving image capture instruction. In addition, for moving images, a voice command "Imaging End" is used as an imaging end instruction.

S115: The imaging unit 71 of the image processing unit 5 captures an image of an object in front of the HMD 1 (imaging data acquisition function 14), and imaging data is stores as the various kinds of data 42 of the storage unit 40 (imaging data storage function 15).

S116: It is determined whether or not the user inputs an instruction to end the trajectory information acquisition process. For example, it is determined by a voice command "Trajectory End" that the instruction to end the trajectory collection process is input. When the end instruction is input, the process proceeds to S117 to end the trajectory information acquisition process. When the instruction to end the trajectory information acquisition process is not input, the process proceeds to S118.

S118: It is determined whether a unit time has elapsed. Specifically, it is determined whether the timer has exceeded the unit time. When the unit time has elapsed, the process proceeds to S119. When the unit time has not elapsed, the process returns to S114.

S119: 1 is added to the point number p, and the process returns to S112. Then, the timer is reset and restarted.

The trajectory point (position information) of the user can be collected at regular time intervals by the above-mentioned trajectory collection process (S100). For example, the unit time of the timer can be set to one second to store the trajectory of the HMD 1 every one second. Further, in parallel with this, the image of the object can be captured and stored during the trajectory collection process in response to an instruction from the user.

Here, two methods will be described for the trajectory information data (data table) stored in the storage unit 40 by the trajectory collection process (S100).

FIG. 7A illustrates a trajectory information storage table 710 in which position information is stored as a measured value. The trajectory information storage table 710 includes, as items, a point number 711 indicating the order of trajectory points and position coordinates 712 corresponding to the trajectory point. For the position coordinates 712, planar position information (X, Y) from GPS information or the like and the value of the altitude (Y) obtained by the altitude sensor 56 are used. Point number 0 indicates position coordinates $(X_0, Y_0, Z_0)$ at the time when the trajectory collection process is started (S110), and point number 1 indicates position coordinates $(X_1, Y_1, Z_1)$ after the unit time (here, one second). Point number k indicates position coordinates $(X_k, Y_k, Z_k)$ at the time when the user inputs an imaging instruction (S114) after k seconds. Point number n indicates position coordinates $(X_n, Y_n, Z_n)$ at the time when the trajectory collection process ends (S117) n seconds after the start.

In addition, the position coordinates 712 are data with a fixed-length size in the data table. Therefore, when the position coordinates 712 are recorded in time series, the data of the point number 711 can be omitted. That is, the data of the position coordinates of a target point number p can be searched by a multiple value p of the fixed length size.

Here, when it is difficult to acquire the position information from the GPS information or the like, relative value information (difference value information) of, for example, the acceleration sensor 54 or the gyro sensor 55 of the sensor unit 50 is temporarily stored. Then, in a stage in which the position information (absolute value information) can be acquired from the GPS information or the like at any trajectory point, the temporarily stored relative value is corrected to an absolute value.

FIG. 7B illustrates a difference trajectory information storage table 720 in which position information is stored as a difference value. When a change in the measured value between the trajectory points is small, it is practical to store not the measured value but the difference value (the amount of change) in order to reduce the amount of data stored.

The difference trajectory information storage table 720 includes, as items, a point number 721 and difference position coordinates 722 corresponding to the trajectory point. In the difference position coordinates 722, difference values between the position coordinates of the previous trajectory point and the position coordinates of the current trajectory point are described. That is, difference values ($\Delta X$, $\Delta Y$) between the planar position coordinates are described by the distances between two trajectory points in a longitude direction and a latitude direction. A difference value ($\Delta Z$) in the height direction is also described by the distance.

Point number 1 indicates difference position coordinates ($\Delta X1$, $\Delta Y1$, $\Delta Z_1$) one second after the start of the trajectory collection process, point number k indicates difference position coordinates ($\Delta Xk$, $\Delta Yk$, $\Delta Z_k$) k seconds after the start, and point number n indicates difference position coordinates ($\Delta Xn$, $\Delta Yn$, $\Delta Z_n$) at the time when the trajectory collection process is ended (n seconds after the start). The relationship with the values of the position coordinates 712 in FIG. 7A (trajectory information storage table 710) is as follows:

$$\Delta X_p = X_p - X_{p-1}, \Delta Y_p = Y_p - Y_{p-1}, \Delta Z_p = Z_p - Z_{p-1}.$$

FIG. 7C illustrates a starting point/end point position coordinate table 730 that stores position information when trajectory collection starts and when trajectory collection ends. This table is required when the display position (absolute position) of the avatar is calculated using the difference trajectory information storage table 720 illustrated in FIG. 7B.

The starting point/end point position coordinate table 730 includes, as items, starting point/end point distinguishment 731 that distinguishes between a starting point and an end point of trajectory collection and position coordinates 732 in which each position information item is represented by an absolute value. Of course, the position coordinates of the starting point are the same as the position coordinates ($X_0$, $Y_0$, $Z_0$) of point number 0 and the position coordinates of the end point are the same as the position coordinates ($X_n$, $Y_n$, $Z_n$) of point number n in FIG. 7A (trajectory information storage table 710).

As described above, when the position information (absolute value) 732 of the starting point and the end point is stored, it is possible to convert the difference trajectory information storage table 720 illustrated in FIG. 7B into the trajectory information storage table 710 illustrated in FIG. 7A. In particular, the storage of the position coordinates ($X_n$, $Y_n$, $Z_n$) of the end point makes it possible to display the avatar with high efficiency. The reason will be described.

The avatar is displayed in reverse order of time from the end point (point number n) of the trajectory, which will be described below. At that time, when the position coordinates of the end point at which the display is started are not known, all of the difference position coordinates 722 illustrated in FIG. 7B need to be added to the position coordinates ($X_0$, $Y_0$, $Z_0$) of the starting point illustrated FIG. 7C in order to calculate the position coordinates of the end point. When the position coordinates ($X_n$, $Y_n$, $Z_n$) of the end point are known, the avatar is displayed at the position coordinates first. Then, the position where the avatar is displayed can be easily calculated by subtracting the difference position coordinates ($\Delta Xn$, $\Delta Yn$, $\Delta Z_n$) of point number n in FIG. 7C from the current position coordinates. After that, the same process may be repeated.

These trajectory information items (the trajectory information storage table 710, the difference trajectory information storage table 720, and the starting point/end point position coordinate table 730) may be not only stored in the various kinds of data 42 of the storage unit 40, but also stored in the external server 6 through the network 5 for each trajectory point or when the trajectory information table is completed, as described with reference to FIG. 3. The storage of the data in the server 6 makes it possible to reduce the amount of data stored in the HMD 1.

Next, the storage of the imaging data will be described. The imaging data corresponds to both still images and moving images.

FIG. 8A illustrates a still image data storage table 810 that stores still images. The still image data storage table 810 includes a point number 811 indicating the trajectory point at the time when an imaging instruction is input, an imaging direction 812 indicating an imaging direction, an imaging data size 813, and imaging data 814. In this example, at the trajectory point k (point number k), the HMD 1 captures an image in the direction of $\Theta_k$, and stores imaging data $D_k$ having an imaging data size $M_k$ in the various kinds of data 42 of the storage unit 40 (S115).

The trajectory information storage table 710 and the still image data storage table 810 according to this example are stored so as to be associated with each other, which makes it possible to reproduce the still image captured in synchronization with the movement position of the HMD 1 every unit time (here, one second).

FIG. 8B illustrates a moving image data storage table 820 that stores moving images. Similarly to the case of the still image illustrated in FIG. 8A, the moving image data storage table 820 includes a point number 821 indicating the trajectory point at the time when an imaging instruction is input, an imaging direction 822 when imaging is started, an imaging data size 823, and imaging data 824. Further, in the case of a moving image, an imaging time (start and end) 825 is described. This is to respond to the case in which a moving image is captured across a plurality of trajectory points. When the moving image is reproduced every unit time (every second), it is possible to synchronize the reproduction with the time when the avatar is displayed.

In this example, at the trajectory point k (point number k), the HMD 1 starts imaging from a start time $T_{ks}$ in the direction of $\Theta_k$ and stores imaging data $D_k$ having a data size $M_k$ captured until an end time $T_{ke}$ in the various kinds of data 42 of the storage unit 40 (S115). The moving image data may be reproduced on the entire display screen of the HMD. In this example, the moving image data is displayed on a reduced sub-screen and is reproduced from the moving image capture start time $T_{ks}$ to the moving image capture end time $I_{ke}$.

The information of these imaging data items (the still image data storage table 810 and the moving image data storage table 820) is also stored in the external server 6 through the network 5 as described with reference to FIG. 3, which makes it possible to reduce the amount of data stored in the HMD 1.

Next, the avatar display process (S200) of the HMD 1 will be described. This processing procedure is stored in the various programs 41 of the storage unit 40. For the display of the avatar, the avatar information is extracted from the avatar information storage function 16 (avatar generation function 17), and the avatar is displayed on the display unit 72 of the HMD 1 (avatar display function 18). For the shape of the avatar, the avatar has the same life size as the user, and the height of the avatar is set by the user. For convenience, the avatar may have the height obtained by adding 10 cm to the distance from the ground (the height of the HMD 1 from the ground) measured by the distance sensor 53 of the sensor unit 50 in a standing state. For the display position of the avatar, the avatar is displayed on the display unit 72 of the HMD so as to be superimposed on a background image according to the position information stored in, for example, the trajectory information storage table 710.

When the trajectory information or the imaging data to be used are stored in the various kinds of data 42 in the HMD, the trajectory information or the imaging data is used. However, when the trajectory information or the imaging data is stored in the external server 6 through the LAN communication unit 61 of the communication processing unit 60, it is acquired from the server 6 and is then used.

In this embodiment, the avatar is displayed in reverse order of time from new trajectory information to old trajectory information on the basis of the trajectory point of the user. Since the avatar is displayed in reverse order of time, the user can return from the end point (current point) to the starting point (starting place) through the same route as that through which the user actually passed.

Figure 9A:
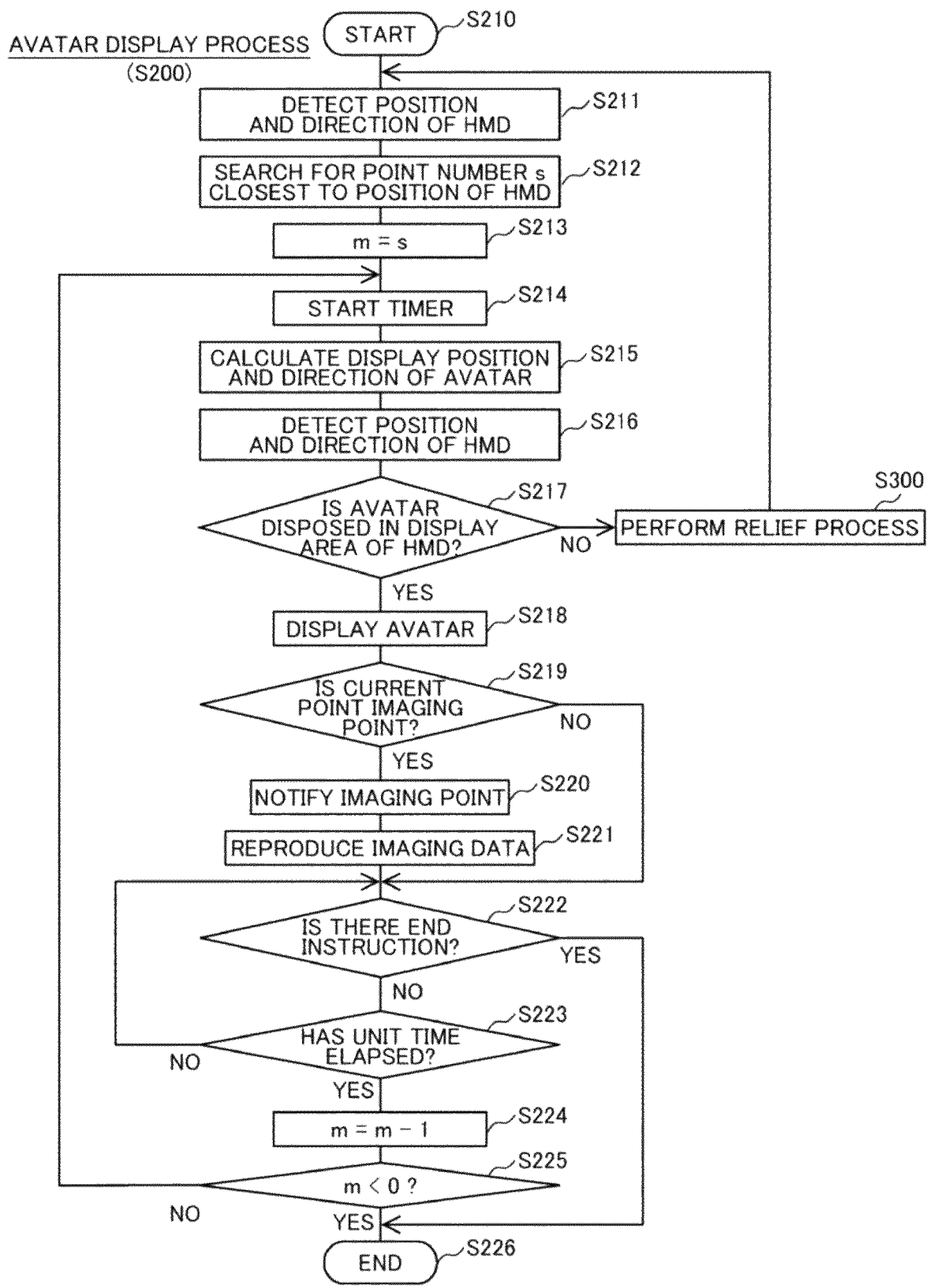
FIG. 9A is a flowchart illustrating the entire avatar display process.

FIG. 9A is a flowchart illustrating the entire avatar display process (S200).

S210: The avatar display process (S200) is started. In this example, when the user utters a voice command "Avatar Start" which means the start of the display of the avatar, it is determined that an avatar display start instruction is input.

S211: The current position and direction of the HMD 1 worn by the user are detected. A detection method is performed by, for example, the GPS sensor 51, the geomagnetic sensor 52, and the height sensor 56 of the sensor unit 50 as in S113 of the trajectory collection process (S100).

S212: Point number s at the position coordinates closest to the current position of the HMD 1 is searched with reference to the trajectory information storage table 710 (or the difference trajectory information storage table 720). That is, when the current position is the end point in trajectory collection, s=n is established. When the user subsequently moves from the end point, s≠n is established.

S213: Point number s closest to the current position is set as the initial value of point number m to be displayed. Therefore, it is possible to perform display from the trajectory point close to the current position of the user.

S214: The timer is started. The timer uses the clock provided in the main control unit 10. Since the trajectory of the user is collected at regular time intervals (unit time), the timer is used in order to display the avatar in accordance with that. However, the unit time used to display the avatar may be different from the unit time in the trajectory collection process and may be the time multiplied by an arbitrary coefficient. For example, when the unit time used to display the avatar is set to ½ of the time (0.5 seconds in this example), the displayed avatar can be moved at double speed. On the contrary, when the unit time used to display the avatar is set to twice the time (two seconds in this example), the displayed avatar can be moved at ½ speed (slow). Further, the avatar may be sequentially interpolated and displayed (animated) between the trajectory points (for example, every 1/24 seconds) so as to be displayed as a moving image.

S215: The display position and direction of the avatar are calculated. When the trajectory information is stored in the trajectory information storage table 710, the values ($X_m$, $Y_m$, $Z_m$) of the position coordinates 712 corresponding to point number m are read out, and the avatar is disposed at a planar position ($X_m$, $Y_m$) and an altitude ($Z_m$).

When the trajectory information is stored in the difference trajectory information storage table 720, the values (difference values) of the difference position coordinates 722 of point number (m+1) are read out and subtracted from the previous display position (point number=m+1). That is, $X_m=X_{m+1}-\Delta X_{m+1}$, $Y_m=Y_{m+1}-\Delta Y_{m+1}$, and $Z_m=Z_{m+1}-\Delta Z_{m+1}$ are established. However, the initial position (m=s) is calculated using the values of the position coordinates ($X_n$, $Y_n$, $Z_n$) of the end point described in the starting point/end point position coordinate table 730 and the values of the difference position coordinates 722 up to point number s.

For convenience, the direction in which the avatar is facing is a direction connecting the previous trajectory point (m+1) and the current trajectory point (m).

S216: The current position and direction of the HMD 1 are detected. This is the same process as S211. The initial position (m=s) can be omitted because it has already been detected in S211.

S217: The visual field calculation function 19 calculates a display area of the HMD 1, that is, a visual field area of the user from the current position and direction of the HMD 1 and determines whether or not the position of the avatar calculated in S215 is within the display area. When it is determined that the avatar can be disposed in the display area of the HMD 1, the process proceeds to S218. When it is determined that the avatar is not capable of being disposed in the display area, a relief process in S300 is performed. In the relief process in S300, a guidance process that allows the user to change the viewing direction or to move to the position where the avatar can be seen is performed, which will be described in detail below with reference to FIG. 9B. The avatar can be disposed in the visual field of the user by the determination process in S217 and the relief process in S300. Therefore, the user can move (track) without losing sight of the avatar or overtaking the avatar.

S218: When it is determined that the avatar can be displayed in the display area of the HMD 1, the avatar information is read from the avatar information storage function 16, and the avatar is generated. Then, the avatar is displayed on the display unit 72 of the HMD 1 at the display position and in the display direction of the avatar calculated in S215.

S219: It is determined whether or not the displayed current point number m is the imaging point k with reference to the still image data storage table 810 or the moving image data storage table 820. When it is determined that the trajectory point is the imaging point, the process proceeds to S220. When it is determined that the trajectory point is not the imaging point, the process proceeds to S222.

S220: It is notified that the current time is the imaging point. As a method for notifying the imaging point, the color of the displayed avatar is changed or the avatar is blinked to notify the user of the imaging point.

S221: The corresponding imaging data is read from the still image data storage table 810 or the moving image data storage table 820 and is then reproduced in response to an instruction from the user. The reproduction of the imaging data is performed by a voice command "Reproduction". The imaging data may be reproduced on the entire display screen of the HMD. However, in this example, the imaging data is displayed on the reduced sub-screen. The imaging data is continuously displayed for a certain period of time and then the reproduction of the imaging data ends.

S222: It is determined whether or not the user inputs an instruct to end the avatar display process. For example, it is determined by a voice command "Avatar End" that the instruction to end the avatar display process is input. When the instruction to end the avatar display process is input, the process proceeds to S226 to end the avatar display process.

S223: It is determined whether the unit time has elapsed. When it is determined that the unit time has elapsed, the process proceeds to S224. When it is determined that the unit time has not elapsed, the process returns to S222.

S224: 1 is subtracted from point number m to obtain a new point number. Then, the trajectory point returns to the previous trajectory point in time.

S225: It is determined whether the value of new point number m is less than 0 (that is, whether the value exceeds the starting point m (=0) of the trajectory). When the value of point number m is not less than 0, the process returns to S214, and the display of the avatar is continued for the next trajectory point. When the value of point number m is less than 0, the display of the avatar is completed at all of the trajectory points. Therefore, the process proceeds to S226, and the avatar display process ends.

FIG. 9B is a flowchart illustrating the relief process (S300) in FIG. 9A. This process is performed when the determination result in S217 is "No", that is, when the avatar is not capable of being disposed in the display area. After this step ends, the process returns to S211.

S301: The visual field calculation function 20 determines whether or not the avatar can be disposed by changing the direction of the HMD 1. When the avatar can be disposed, the process proceeds to S302. When the avatar is not capable of being disposed, the process proceeds to S303.

S302: Since this corresponds to a case in which the HMD is not oriented in the direction in which the avatar is present, the user is guided by voice or display to change the direction of the HMD. For example, the voice decoding unit 83 of the voice processing unit 80 generates voice guides such as "Right" and "Left". At that time, the avatar may be displayed on the screen and may be controlled to utter the words. After that, the process returns to S211.

Figure 10A:
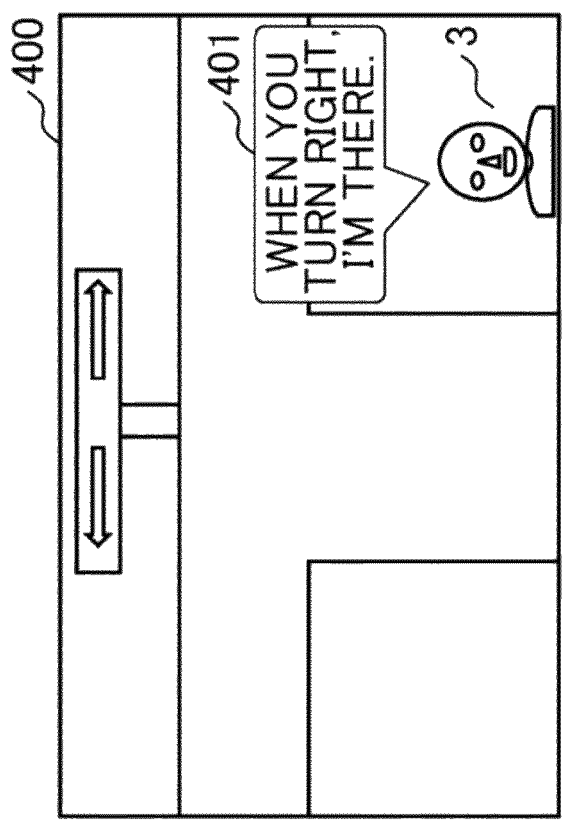
FIG. 10A is a diagram illustrating an example of direction change guide display.

Here, FIG. 10A is a diagram illustrating an example of the direction change guide display in S302. An avatar 3 appears on a display screen 400, and a message 401 indicating that the avatar is present is displayed on the right side. When the user turns to the right side in response to the display, a new direction of the HMD is detected in S216 of FIG. 9A. It is determined in S217 that the avatar is present in a new display area, and the avatar can be displayed in S218.

S303: When the avatar is not capable of being disposed by changing the direction of the HMD 1 in S301, it is considered that the current position is far from any point where the trajectory is collected. Therefore, it is determined whether or not map information can be acquired in order to guide the user to a proximity point. For example, when a navigation application can be used, the process proceeds to S304. When the map information is not capable of being acquired, the process proceeds to S306.

S304: Route analysis to the nearest trajectory point s searched in S212 is performed using the navigation application.

S305: Route information (new trajectory point) up to the trajectory point s is added to the trajectory information storage table 710. After that, the process returns to S211, and the trajectory points including the added trajectory point become the positions where the avatar is to be displayed. As a result, the avatar is disposed in the display area of the HMD in S217 and can be displayed in S218.

S306: When the map information is not capable of being acquired in S303, a movement direction to the nearest trajectory point s is presented to the user. A presentation method is performed by voice or AR display. After that, the process returns to S211. The user can move in the presented direction to approach the nearest trajectory point s. As a result, the avatar is disposed in the display area in S217 and can be displayed in S218.

Figure 10B:
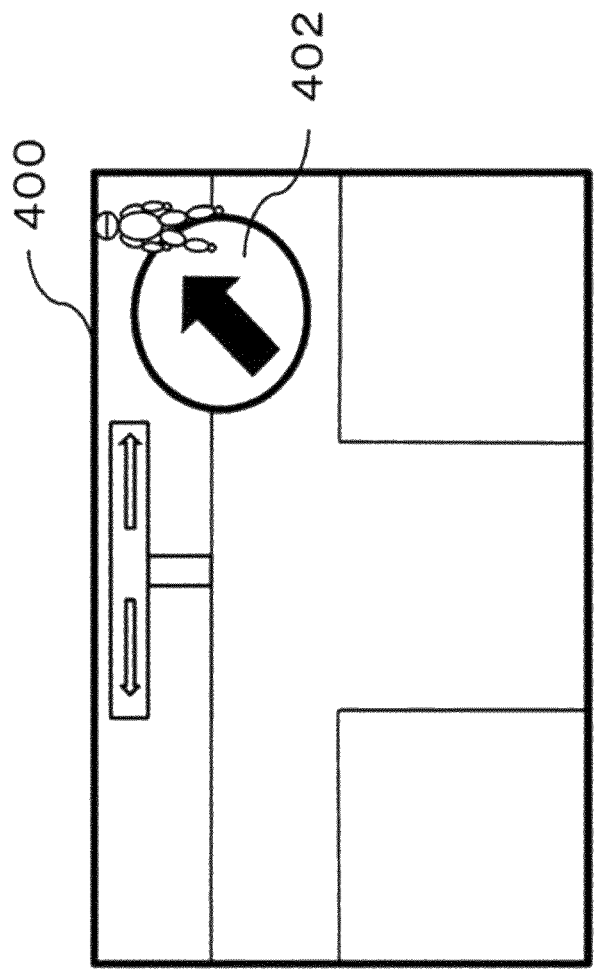
FIG. 10B is a diagram illustrating an example of movement direction guide display.

Here, FIG. 10B is a diagram illustrating an example of the movement direction guide display in S306. The direction in which the user needs to move is notified by AR display 402 on the display screen 400. The AR display 402 may be configured such that a traveling direction is known, and characters, icons (arrows), or the like are used as the AR display 402.

As described above, when it is determined that the avatar is not capable of being disposed in the display area of the HMD, the relief process in S300 can be performed to guide the user to the position and direction where the avatar is seen. Therefore, the user can move (track) without losing sight of the avatar.

FIGS. 11A and 11B are diagrams illustrating an example of the display of the avatar. This example corresponds to the schematic diagram during the trajectory collection illustrated in FIG. 5.

The avatar 3 is displayed on the display screen 400 illustrated in FIG. 11A so as to move along the collected trajectory points of the HMD in reverse order of time. That is, the display position of the avatar 3 is moved in the direction of an arrow in the order of the trajectory points 504, 503, 502, and 501 (represented by ● marks). Among them, since the trajectory point 503 is the imaging point k, it is represented by a ⊙ mark so as to be distinguished from other positions. In addition, in order to reproduce the direction in which the user 2 (HMD) was oriented during the trajectory collection process, the avatar 3 returns to the original path in the posture in which the direction of the body when the avatar 3 is moved is opposite to the traveling direction of the avatar 3 (backward).

The display screen 400 illustrated in FIG. 11B shows the display state of the avatar 3 at the trajectory point 503. Since the trajectory point 503 is a corner, the direction of the avatar 3 is changed. In addition, since the trajectory point 503 is an imaging point, the avatar 3 is displayed such that the color is changed. Here, when the user inputs an instruction to reproduce the imaging data, an image 510' of an object 510 captured at the imaging point is displayed.

In this example, the trajectory points (● marks) and the traveling directions (arrows) are displayed on the display screen 400 in order to inform the user of the return route. However, the trajectory points and the traveling directions may not be displayed.

Further, the trajectory points of the avatar are displayed every unit time (every one second). However, the invention is not limited thereto. The trajectory points may be displayed at other time intervals. For example, when the trajectory points are interpolated and displayed every 1/24 seconds, the avatar is displayed as a smooth moving image like a movie.

Next, an operation method of the user for the HMD 1 will be described. As described above, in this embodiment, a voice command is used as the operation of the user.

FIG. 12 is a table showing an example of voice commands used to operate the HMD. The items of the voice command table 600 include command classification 601, voice commands 602 issued by the user, command names 603, and processing content 604.

The voice command classification 601 is divided into an item related to trajectory collection and an item related to avatar display. The voice commands 602 related to trajectory collection include "Start of Trajectory" and "Trajectory Start" for starting the trajectory collection process, "End of Trajectory" and "Trajectory End" for ending the trajectory collection process, "Imaging" and "Recording" for capturing still images, "Imaging Start" and "Recording Start" for starting the capture of moving images, and "Imaging End" and "Recording End" for ending the capture of moving images.

The voice commands 602 related to avatar display include "Start of Avatar" and "Avatar Start" for starting the avatar display process, "End of Avatar" and "Avatar End" for ending the avatar display process, and "Reproduction" and "Imaging Data" for reproducing still images or moving images. It goes without saying that the voice commands listed here are examples and can be appropriately set according to the user's preference.

On the other hand, the HMD 1 can make a voice response corresponding to the voice command issued by the user using the voice synthesis function of the voice decoding unit 83 of the voice processing unit 80. As a result, for example, it is possible to respond with the same voice (echolalia) as the voice command of the user or to make a voice response for confirming the voice command of the user. For example, when the user's response to an inquiry "XX, isn't it?" from the HMD is "Yes", the HMD 1 responds with a confirmation voice "Execute XX". When the user's response is "No", the HMD 1 responds with a confirmation voice "Cancel XX". In addition, the voice commands "Yes" and "No" used by the user in the response are not illustrated in FIG. 12. However, it goes without saying that these voice commands are also included in the voice command table 600.

Further, the voice synthesis function of the voice decoding unit 83 can be used to generate a synthetic voice such as a voice "Right" for prompting rotation to the right and a voice "Left" for prompting rotation to the left. This can be used in the process of S306 in FIG. 9B.

An operation instruction for the HMD 1 may be achieved by a method other than the voice commands. For example, an operation menu is displayed on the display screen of the HMD 1, and the user selects an item by a gesture (the movement of a hand or a finger). In this case, the imaging unit 71 of the image processing unit 70 can capture an image of the user's finger, recognize the movement of the finger from the captured image, and use it for the operation.

FIG. 13 is a diagram illustrating an operation instruction by a user's finger. For example, a "photograph" menu 411 and a "video" menu 412 are displayed as selection menus on an operation screen 410 of the HMD 1. It is preferable that the menus are translucently displayed. However, the invention is not limited thereto.

When the user brings a finger 415 closer to the display screen 410 from the outside of the HMD 1 in order to select, for example, the "video" menu 412, the imaging unit 71 detects a finger image 415 that gradually increases toward the display screen 410. Further, the imaging unit 71 recognizes that the finger image 415 is heading toward the "video" menu 412 and determines that "video" is selected and designated. As other operations, only a "Start" menu is simply displayed when the trajectory collection or the avatar display starts, and an "End" menu is simply displayed when the trajectory collection or the avatar display ends. Then, the imaging unit 71 detects the approach of the finger image 415 of the user and determines that a start instruction or an end instruction is input.

In addition to this, a method may be used in which a touch sensor is provided in the operation input unit 90 of the HMD 1 to detect that the user touches the HMD 1 with a finger or hand.

According to Embodiment 1, it is possible to guide the user, who has forgotten the place where the user stopped off when moving or the return route, so as to easily understand the return route.

Embodiment 2

In Embodiment 1, the position coordinates of the HMD are as three-dimensional coordinates (X, Y, Z). However, in Embodiment 2, a case in which the position coordinates are stored as two-dimension coordinates (X, Y) will be described. The basic configuration of an HMD according to Embodiment 2 is the same as that in Embodiment 1, and the differences from Embodiment 1 will be described.

Since a change in the height direction is small in a normal moving state on a flat ground, the avatar can be displayed on the basis of the planar position coordinates even though data in the height direction is omitted. A trajectory collection process is performed according to the same flowchart (S100) as that in Embodiment 1 (FIG. 6). Then, the collected data is stored in tables illustrated in FIGS. 14A and 14B.

FIG. 14A illustrates a two-dimensional trajectory information storage table 740 in which position information is stored as a difference value. The two-dimensional trajectory information storage table 740 includes, as items, a point number 741 indicating the number of each trajectory point and difference position coordinates 742 indicating the planar position of the trajectory point. As illustrated in FIG. 7B, the difference position coordinates 742 are not the absolute values of the position coordinates, but are difference values (the amount of change) between adjacent trajectory points, which reduces the amount of data stored.

In this example, since the unit time is set to one second, point number 1 indicates difference position coordinates $(\Delta X1, \Delta Y_1)$ one second after the start of the trajectory collection process, point number k indicates difference position coordinates $(\Delta Xk, \Delta Y_k)$ k seconds after the start, and point number n indicate difference position coordinates $(\Delta Xn, \Delta Y_n)$ at the time when the trajectory collection process ends (n seconds after the start). A method for calculating the difference position coordinates is the same as that in Embodiment 1 (FIG. 7B).

FIG. 14B illustrates a two-dimensional starting point/end point position coordinate table 750 that stores position information when the trajectory collection starts and when the trajectory collection ends. This table is required when the display position (absolute position) of the avatar is calculated using the two-dimensional difference trajectory information storage table 740 illustrated in FIG. 14A.

The two-dimensional starting point/end point position coordinate table 750 includes, as items, starting point/end point distinguishment 751 for distinguishing between the starting point and the end point of the trajectory collection and position coordinates 752 for indicating each position information item as an absolute value, and is the same as that in FIG. 7C. However, in the position coordinates 752, only the position coordinates $(X_0, Y_0, Z_0)$ of the starting point store the position coordinate $(Z_0)$ in the height direction. This is to respond to a case in which the amount of change in altitude is greater than a predetermined value (threshold value) during the acquisition of the trajectory information.

In Embodiment 2, only the two-dimensional position coordinates are dealt with. However, when the altitude changes, the following process is performed.

When the user goes up (down) a hill, a change $(\Delta X, \Delta Y)$ in the planar position coordinates of the HMD is linear, and a change $(\Delta Z)$ in the altitude of the HMD is also linear. When the user goes up (down) stairs, a change $(\Delta X, \Delta Y)$ in the planar position coordinates of the HMD is the width of the stairs, and a change $(\Delta Z)$ in the altitude of the HMD is also the difference between the stairs.

In the case of an escalator, a change $(\Delta X, \Delta Y)$ in the planar position coordinates of the HMD is linear, and a change $(\Delta Z)$ in the altitude of the HMD $(\Delta Z)$ is also linear. The escalator is distinguished from the hill because the amount of change in acceleration in the escalator is smaller than that in the hill. In the case of an elevator, the planar position coordinates of the HMD hardly change $(\Delta X=0, \Delta Y=0)$, and only the altitude of the HMD changes $(\Delta Z \neq 0)$.

As described above, when the user moves on, for example, the hill, the stairs, the escalator, or the elevator, characteristic changes $(\Delta X, \Delta Y)$ and $(\Delta Z)$ occur in the detection values of the planar position coordinates and the altitude. Therefore, when the avatar is displayed, the change is captured, and route information (for example, the hill, the stairs, the escalator, or the elevator) is displayed. In addition, the avatar is displayed so as to be superimposed on the image of, for example, the hill, the stairs, the escalators, or the elevators, which makes it possible to display the avatar with a sense of realism. Furthermore, a great effect can be obtained by linking with map information such as an underground shopping mall map.

When the amount of change in the altitude is greater than a predetermined value (threshold value), the trajectory collection process using the two-dimensional trajectory information storage tables 740 and 750 ends to acquire a trajectory A. Then, the process newly proceeds to the trajectory collection process using the three-dimensional trajectory information storage tables 710 to 730 according to Embodiment 1 to acquire a trajectory B. After that, when the amount of change in the altitude falls within the threshold value, the trajectory collection process using the two-dimensional trajectory information storage tables 740 and 750 is restarted to acquire a trajectory C.

The use of this method makes it possible to reduce the amount of data stored as much as possible. Of course, the two-dimensional trajectory information storage tables 740 and 750 according to Embodiment 2 may be converted into the three-dimensional trajectory information storage tables 710 to 730 according to Embodiment 1.

In the above-described Embodiments 1 and 2, the outdoor space in which the GPS sensor 51 of the sensor unit 50 relatively easily acquires GPS information (position information) is assumed. However, there is a case in which the GPS information is not capable of being acquired as in underground malls and indoors. When the GPS information is not capable of being acquired, the GPS information is supplemented with information from, for example, the acceleration sensor 54 or the gyro sensor 55 of the sensor unit 50.

When the position information is not capable of being acquired from, for example, the GPS information from the starting point to the end point even once, the position coordinates of the starting point are stored as X0=0 and Y0=0. In this case, the position coordinates of the height are also stored as Z0=0. Further, the position coordinates of the end point are calculated by integrating all of the difference position coordinates from the starting point to the end point.

Embodiment 3

In Embodiment 1, when the avatar is displayed, the avatar is oriented in a direction opposite to the traveling direction and moves backward. In contrast, in Embodiment 3, the avatar is displayed so as to be oriented in the traveling direction.

Figure 15:
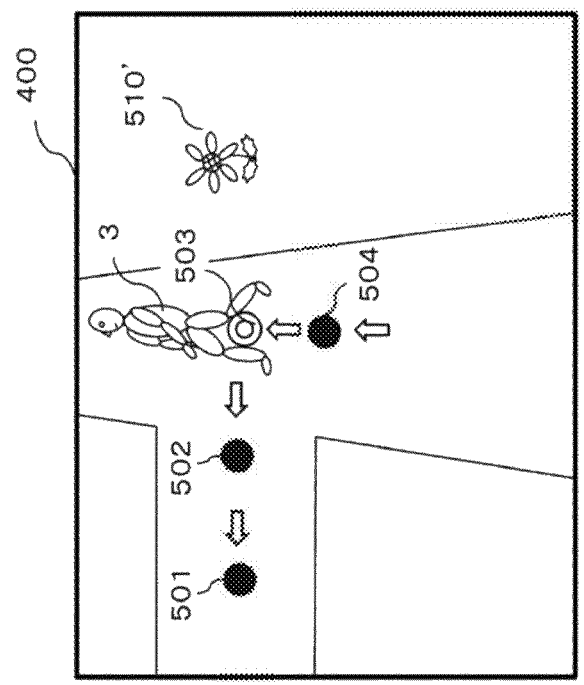
FIG. 15 is a schematic diagram illustrating an example of the display of an avatar according Embodiment 3.

FIG. 15 is a schematic diagram illustrating the display of the avatar in Embodiment 3. The avatar 3 is displayed in a posture facing the traveling direction (forward) on the display screen 400. That is, the orientation of the avatar 3 is set in a vector direction from the current trajectory point 503 to the next trajectory point 502. Therefore, it is possible to eliminate the discomfort of the user caused by the orientation of the avatar as in Embodiment 1 (FIG. 11B) (the traveling direction of the avatar and the orientation of the avatar are not matched with each other).

Whether the avatar is oriented forward (Embodiment 3) or backward (Embodiment 1) depends on the user's preference. Therefore, it is more preferable that the user can select and set the display form of the orientation of the avatar.

Embodiment 4

In Embodiment 4, when there is a building or the like in the visual field of the HMD and the avatar is located behind the building, the avatar is hidden.

Figure 16:
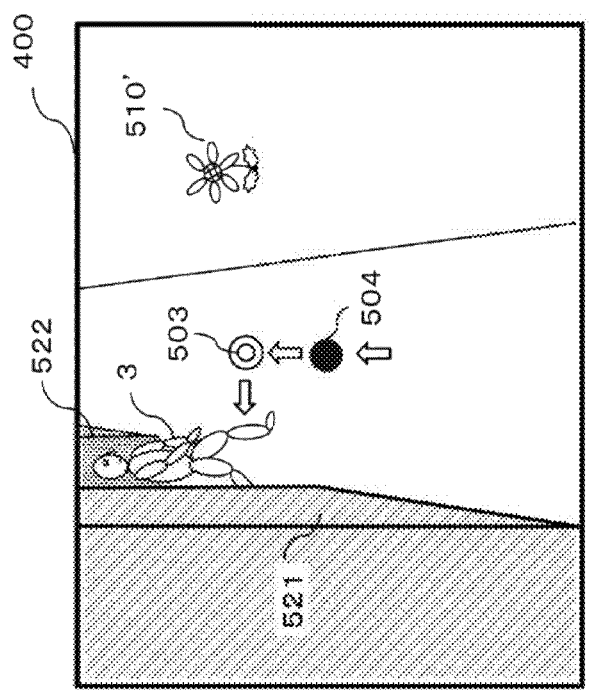
FIG. 16 is a schematic diagram illustrating an example of the display of an avatar according Embodiment 4.

FIG. 16 is a schematic diagram illustrating the display of the avatar in Embodiment 4. Here, the avatar 3 moves backwards. In addition, FIG. 16 illustrates a case in which a building 521 and a building 522 are present near a movement route and the avatar 3 is hidden by the building 521. In this case, control is performed such that a portion of the avatar 3 hidden by the building 521 is not displayed. Whether or not the avatar 3 is hidden can be determined by comparing the distances between the buildings 521 and 522 and the avatar 3, and the distances to the buildings 521 and 522 can be measured by the distance sensor 53.

Therefore, when the avatar is displayed so as to be superimposed on a real space that can be visually recognized through the HMD, it is possible to perform realistic display without a sense of discomfort. When the entire avatar is hidden and is not displayed, there is a concern that it will be difficult to track the avatar after that. Therefore, the hidden portion of the avatar may be translucently displayed such that the avatar can be tracked.

The images of the building 521 and the building 522 may be displayed by using, for example, Street View (Google Inc.) which is an Internet service that provides a scene along the road as a panoramic photograph. In addition, the name of a building or the like attached to the building or the like may be used depending on the position and direction of the HMD 1.

Embodiment 5

In Embodiment 5, imaging is not performed in response to an instruction from the user, but is automatically performed.

The imaging unit 71 of the HMD starts imaging from the starting point, always captures images for a predetermined period of time (for example, a period of time that is twice the unit time between the trajectory points used in the trajectory collection process) from the present time using loop imaging, and temporarily stores the images. The images automatically captured by this operation are a moving image or still images for a predetermined period of time (for example, two seconds) before the present time. In the case of the still image, a sufficient function can be exhibited only by temporarily storing one or two still images between a trajectory point and the next trajectory point. Then, the image captured at a peculiar place, for example, the point where the movement direction is changed on the movement route remains.

A specific operation of the automatic imaging will be described with reference to the schematic diagram illustrating trajectory collection in FIG. 5. In FIG. 5, at the time of the trajectory point 504, the images (a period of time that is twice the unit time) from the trajectory point 502 to the trajectory point 504 are temporarily stored. However, the movement direction (a motion vector between the points) changes by 90 degrees at the trajectory point 503. Therefore, the images captured from the trajectory point 502 to the trajectory point 503 are automatically stored as the images immediately before the direction of the motion vector changes greatly. The image data of the trajectory point 503 to be stored may be a moving image (a moving image frame captured up to the trajectory point 503) or still images (the captured data of the trajectory point 503).

According to the imaging method of Embodiment 5, when the user changes the traveling direction, the images captured in the traveling direction immediately before the traveling direction is changed are stored. Therefore, it is possible to display the images most suitable to evoke the memory of the user.

Embodiment 6

In Embodiment 6, information related to, for example, the posture of the user is also collected in the trajectory collection process and is reflected when the avatar is displayed.

For example, the distance sensor 53 of the sensor unit 50 detects the distance from the ground or floor to the HMD 1 (that is, the height of the head of the user), and the distance is collected at each trajectory point. The detection value of the distance is compared with the height (known) of the user to estimate the posture (for example, a standing posture, a sitting posture, a crouching posture, or a sleeping posture) of the user who wears the HMD 1. The information of the posture is reflected in the avatar to be displayed, and a standing avatar, a sitting avatar, or the like is displayed.

Further, the geomagnetic sensor 52 of the sensor unit 50 detects the direction of the face of the user who wears the HMD 1. Information of the direction of the face is reflected in the avatar to be displayed such that the direction of the face of the avatar is changed at each trajectory point. In addition, the direction of the body of the avatar may be estimated on the basis of the direction of the face and then changed, or may be changed according to vector information (traveling direction) between the trajectory points. The display of the information makes it possible to display a more realistic avatar.

Embodiment 7

In Embodiment 7, the time when the user passed through each trajectory point is stored in the trajectory collection process, and the passage time is displayed on the display screen when the avatar is displayed.

FIG. 17A illustrates an example of a trajectory information storage table 710' according to Embodiment 7. The trajectory information storage table 710' differs from the trajectory information storage table 710 according to Embodiment 1 (FIG. 7A) in that a passage time 713 when the user passed through each trajectory point is additionally described.

FIG. 17B is a diagram illustrating an example of the display of the avatar. A passage time 420 is displayed on the display screen 400 together with the avatar 3. For the passage time, the passage time 713 corresponding to a point number 711 where the avatar is currently displayed may be referred to in the trajectory information storage table 710' illustrated FIG. 17A.

As described above, according to Embodiment 7, since the time when the user passed through the currently displayed trajectory point is displayed, the time is effective information for evoking the memory of the user.

Embodiment 8

In Embodiment 8, a case in which a smartphone is used as a portable video display device instead of the HMD will be described. The smartphone has almost the same hardware configuration and software configuration as the HMD and can implement the same functions as the HMD.

Figure 18:
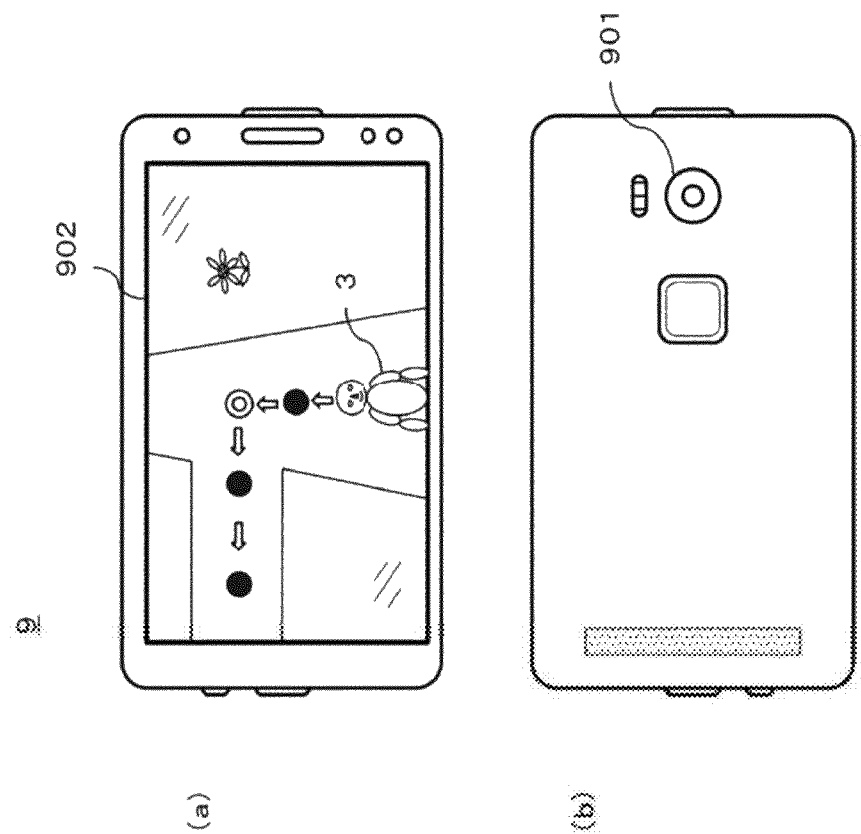
FIG. 18 is a diagram illustrating the outward appearance of a smartphone according to Embodiment 8.

FIG. 18 is a diagram illustrating the outward appearance of a smartphone 9. In FIG. 18, (a) illustrates a front side on which an image is displayed, and (b) illustrates a back side having a camera.

As illustrated in (b), a camera 901 is provided on the back side to capture an outdoor scene. The smartphone 9 has a sensor for detecting a three-dimensional position or the direction of the camera 901 and can collect trajectory information similarly to the HMD.

As illustrated in (a), a display screen 902 into which a touch panel is incorporated is provided on the front side, and an image of an outdoor scene captured by the camera 901 is displayed on the display screen 902. Then, as in Embodiment 1 (FIG. 11A), the avatar 3 can be displayed so as to be superimposed on the display screen 902 on the basis of the collected trajectory information according to the displayed image of the outdoor scene.

As compared to the HMD, in the case of the smartphone 9, it is necessary to aim the camera 901 at an object each time the imaging process is performed in the collection of the trajectory information, and an imaging operation becomes complicated as the number of imaging points increases. Further, for automatic imaging, there is a disadvantage that it is not realistic for the user to keep the imaging direction of the camera 901 constant. However, since the trajectory information can be collected by the existing smartphone, convenience is improved. However, since it is difficult for the user to move while performing imaging, it is more realistic for the user to independently perform imaging only at the main point.

Here, the smartphone is given as an example of the portable video display device. However, any device having an equivalent or similar hardware configuration or software configuration can implement the operation of this embodiment. For example, the invention may be applied to notebook PCs or tablet PCs.

Embodiment 9

In Embodiment 9, a video display system that is used by a plurality of users wearing the HMDs in cooperation with each other will be described.

Figure 19:
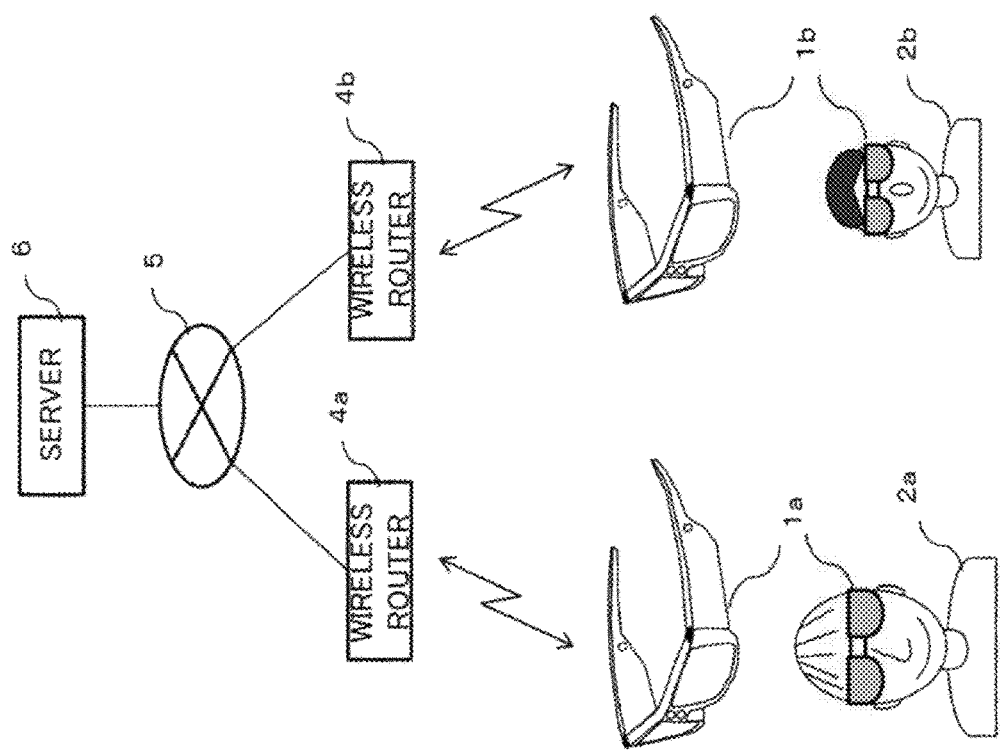
FIG. 19 is a diagram illustrating a configuration of a video display system in which a plurality of HMDs are connected according to Embodiment 9.

FIG. 19 is a diagram illustrating the configuration of the video display system in which a plurality of HMDs are connected to each other. Here, a case in which there are two users 2a and 2b is illustrated, and the two users 2a and 2b wear an HMD 1a and an HMD 1b, respectively. This holds for a case in which there are three or more users.

The HMD 1a worn by the user 2a is connected to the external server 6 through a wireless router 4a and the network 5. In addition, the HMD 1b worn by the user 2b is connected to the same server 6 through a wireless router 4b and the network 5. When the distance between the HMD 1a (user 2a) and the HMD 1b (user 2b) is short, the wireless routers 4a and 4b can be shared.

In this case, the HMDs 1a and 1b collect the trajectories of the users 2a and 2b, respectively. Then, trajectory information of the user 2a wearing the HMD 1a and trajectory information of the user 2b wearing the HMD 1b are stored in the common server 6. Then, the trajectory information of the two users is read from the server 6 and is displayed as two avatars which are virtual images of the two users by the HMDs 1a and 1b, respectively. Therefore, it is possible to refer to each trajectory using the avatars.

FIG. 20 is a schematic diagram illustrating an example of the display of a plurality of avatars. For example, in addition to an avatar 3a of the user 2a wearing the HMD 1a, an avatar 3b of the user 2b wearing the HMD 1b is displayed on a display screen 400a of the HMD 1a. Then, trajectories 520a and 520b in which two users acted are displayed by trajectory points (● and ▲ marks), and the positional relationship between the two users can be displayed in reverse order of time. In this example, it can be seen that two users have joined at an intersection point of a trajectory point 521. This is similarly displayed on a display screen 400b of the HMD 1b.

As described above, according to Embodiment 9, a plurality of users can mutually check the trajectories of others. As a result, as an incidental effect, when another user goes out of sight during trajectory collection, it is possible to immediately know the position of another user.

As a practical aspect of this embodiment, portable information terminals may perform communication therebetween using a near field communication system, such as Bluetooth (registered trademark), without using the server 6 through the wireless router 4 or the network 5. For example, in a case in which a parent moves together with a child who carries a smartphone and the child goes missing, it is possible to immediately search for the child with the HMD or the smartphone of the parent.

Examples of the embodiments of the invention have been described above using Embodiments 1 to 9. However, it goes without saying that the configuration for achieving the technology of the invention is not limited to the above-described embodiments and various modification examples can be considered. For example, a portion of the configuration of a certain embodiment may be replaced with the configuration of another embodiment, and the configuration of another embodiment may be added to the configuration of a certain embodiment. All of these configurations belong to the scope of the invention. In addition, the numerical values and the messages appearing in the sentences and the drawings are just examples, and the effects of the invention may not be impaired even when different numerical values and messages are used.

Some or all of the above-mentioned functions of the invention may be implemented by hardware. For example, some or all of the functions are designed by integrated circuits. In addition, some or all of the functions may be implemented by software. For example, a microprocessor unit or the like interprets and executes programs for implementing each function or the like to implement the functions. Hardware and software may be used together. The software may be stored in the various programs 41 of the HMD 1 in advance at the time of product shipment. After the product is shipped, the software may be acquired from, for example, various server devices on the Internet. Further, the software provided by, for example, a memory card or an optical disk may be acquired.

In addition, the control lines and the information lines illustrated in the drawings are considered necessary for explanation and do not necessarily indicate all of the control lines and the information lines in the product. In practice, it can be considered that almost all configurations are connected to each other.

REFERENCE SIGNS LIST

1 HMD (video display device)
2 User
3 Avatar
4 Wireless router
5 Network
6 Server
9 Smartphone (video display device)
10 Main control unit
40 Storage unit
50 Sensor unit
51 GPS sensor
52 Geomagnetic sensor
53 Distance sensor
56 Altitude sensor
60 Communication processing unit
70 Image processing unit
71 Imaging unit
72 Display unit
80 Voice processing unit
90 Operation input unit

The invention claimed is:

1. A video display device that is worn on a head of a user and displays a traveled route that is completed by the user, the video display device comprising:
    a sensor that detects i) positions of the user based on global position coordinates, and ii) a direction and a height of the head of the user wearing the video display device;
    route information acquisition circuitry that acquires route information of the traveled route of the user based on the positions detected by the sensor;
    a storage that stores the route information of the user acquired by the route information acquisition circuitry, user information of the height and the direction of the head of the user, and information of an avatar which is a virtual image indicating the user;
    a display that displays the traveled route of the user with the avatar; and
    control circuitry that
        stores the route information and the user information,
        generates the avatar from the information of the avatar stored in the storage,
        calculates a current visual field area of the user using the sensor, and
        displays, on the display, the traveled route of the user and the generated avatar on the traveled route, and moves the avatar in reverse along the traveled route of the user based on the current visual field area of the user and the route information of the user stored in the storage,
    wherein, when moving the avatar in reverse along the traveled route of the user, the control circuitry moves the avatar from a current point of the user to a previous passing point of the user on the traveled route, and
    wherein, when the avatar is generated and displayed, the control circuitry compares height information of the user with the user information of the height and the direction of the head of the user stored in the storage to determine a posture and a direction of a face of the avatar.

2. The video display device according to claim 1,
    wherein the route information acquisition circuitry acquires the route information of the traveled route of the user every predetermined unit time and stores, in the storage, position coordinates of each point on the traveled route, and
    wherein the control circuitry reads the position coordinates of each point from the storage every unit time or every time obtained by multiplying the unit time by an arbitrary coefficient and disposes the avatar at the position coordinates.

3. The video display device according to claim 2, further comprising:
    imaging circuitry that captures an image of an outdoor scene,
    wherein imaging data captured by the imaging circuitry is stored in the storage so as to be associated with an imaging point which is an imaging position, and
    when the avatar is located at the imaging point, the control circuitry displays an image of the imaging data stored in the storage on the display.

4. The video display device according to claim 3,
    wherein the control circuitry stores, in the storage, an image captured at an imaging point, where a direction of the traveled route of the user has changed, in the imaging data captured by the imaging circuitry, and when the avatar is located at the imaging point where the direction of the traveled route of the user has changed, the control circuitry displays the image of the imaging data stored in the storage on the display.

5. The video display device according to claim 2, further comprising:

an imaging circuitry that captures an image of an outdoor scene, wherein a current image captured by the imaging circuitry is displayed on the display, and the control circuitry displays the avatar based on the traveled route of the user so as to be superimposed in accordance with the image of the outdoor scene displayed on the display.

6. The video display device according to claim 1, wherein the route information acquisition circuitry stores, in the storage, the position coordinates of each point as a difference value from the position coordinates of a previous point in time and stores the position coordinates of the point at least at an end point as an absolute value in the storage.

7. The video display device according to claim 1, wherein, when the avatar is placed outside the current visual field area of the user, the control circuitry performs a guidance process for allowing the user to change a viewing direction or to move to a position where the avatar is seen.

8. A video display device that is worn on a head of a user and displays a traveled route that is completed by of the user, the video display device comprising:

a sensor that detects positions of the user based on global position coordinates, and a height of the head and a direction of the user wearing the video display device;

route information acquisition circuitry that acquires route information of the traveled route of the user based on the positions detected by the sensor;

a storage that stores the route information of the user acquired by the route information acquisition circuitry, user information of the height and the direction of the head of the user, and information of an avatar which is a virtual image indicating the user;

a display unit that displays the traveled route of the user with the avatar; and a control unit that generates the avatar from the information of the avatar stored in the storage, calculates a current visual field area of the user using the sensor, and displays, on the display, the traveled route of the user, the generated avatar on the traveled route, and moves the avatar in reverse along the traveled route of the user based on the current visual field area of the user and the route information of the user stored in the storage, wherein, when moving the avatar in reverse along the traveled route of the user, the control unit moves the avatar from a current point of the user to a previous passing point of the user on the traveled route, and wherein the control unit displays a direction of a body of the avatar so that the avatar faces a traveling direction of the avatar that is in reverse along the traveled route of the user.

9. A video display system in which a plurality of video display devices respectively worn on heads of a plurality of users are connected and traveled routes that are completed by of the plurality of users are displayed by the plurality of video display devices, wherein each of the plurality of video display devices for a respective user includes:

a sensor that detects a direction and a height of the head of the respective user wearing the video display device, and positions of the respective user based on global position coordinates;

route information acquisition circuitry that acquires route information of the traveled route of the respective user based on the positions detected by the sensor;

a storage that stores the route information of the respective user acquired by the route information acquisition circuitry, user information of the height and the direction of the head of the respective user, and information of avatars which are virtual images indicating the respective user and another user;

communication processing circuitry that transmits and receives the route information of each user to and from another video display device worn by another user;

a display unit that displays the traveled route of each user with each avatar; and a control unit that stores the route information and the user information, generates an avatar from the information of the avatars stored in the storage, calculates a current visual field area of the respective user using the sensor, and displays, on the display, the traveled routes of the respective user and another user and the generated avatars of the respective user and the another user on the traveled routes, each of the generated avatars moving in reverse along the traveled routes of the respective user and another user based on the current visual field area of the user and the route information of the user stored in the storage and the route information of another user received by the communication processing unit, wherein, when moving the avatar in reverse along the traveled route of the user and other users, the control unit moves the avatar from a current point of the respective user to a previous passing point of the respective user on the traveled route, and wherein, when the avatar is generated and displayed, the control unit compares height information of the respective user with the user information of the height and the direction of the head of the respective user stored in the storage to determine a posture and a direction of a face of the avatar.

10. A video display method that displays a traveled route that is completed by a user wearing a video display device on a head of the user, the method comprising:

detecting positions of the user based on global position coordinates, a height of the head of the user, and a direction of the user;

acquiring route information of the traveled route of the user based on the detected positions of the user;

storing the acquired route information of the user in a storage;

generating an avatar which is a virtual image indicating the user;

calculating a current visual field area of the user;

displaying, on the display, the traveled route of the user and the generated avatar on the traveled route, and moving the avatar in reverse along the traveled route of the user based on the current visual field area of the user and the route information of the user stored in the storage; and moving the avatar in reverse along the traveled route of the user by moving the avatar from a current point of the user to a previous passing point of the user on the traveled route, wherein when the avatar is generated and displayed, height information of the user is compared with the user information of the height and the direction of the head of the user stored in the storage to determining a posture and a direction of a face of the avatar.

11. The video display method according to claim 10, wherein, in the displaying the generated avatar, when the avatar is moved along the traveled route of the user, the avatar is moved from new route information to old route information in time.

* * * * *